US011994152B2

(12) United States Patent
Drotman et al.

(10) Patent No.: US 11,994,152 B2
(45) Date of Patent: May 28, 2024

(54) ELECTRONICS-FREE PNEUMATIC CIRCUITS FOR CONTROLLING A ROBOT

(71) Applicant: THE REGENTS OF THE UNIVERSITY OF CALIFORNIA, Oakland, CA (US)

(72) Inventors: Dylan Drotman, San Diego, CA (US); Saurabh Jadhav, San Diego, CA (US); Michael T. Tolley, La Jolla, CA (US); David Sharp, San Diego, CA (US); Christian Chan, Brighton, MA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 18/099,828

(22) Filed: Jan. 20, 2023

(65) Prior Publication Data
US 2023/0235756 A1    Jul. 27, 2023

Related U.S. Application Data

(60) Provisional application No. 63/301,983, filed on Jan. 21, 2022.

(51) Int. Cl.
*F15B 13/02* (2006.01)
*B25J 9/14* (2006.01)
*B62D 57/032* (2006.01)

(52) U.S. Cl.
CPC .............. *F15B 13/02* (2013.01); *B25J 9/142* (2013.01); *B62D 57/032* (2013.01); *F15B 2211/40* (2013.01)

(58) Field of Classification Search
CPC ......... F15B 13/02; B25J 9/142; B62D 57/032
See application file for complete search history.

(56) References Cited

U.S. PATENT DOCUMENTS 10,828,788 B2    11/2020    Lessing et al.
2022/0341442 A1    10/2022    Wille et al.

FOREIGN PATENT DOCUMENTS

WO    2021055804 A1    3/2021

OTHER PUBLICATIONS

Drotman, D., et al., 3D Printed Soft Actuators for a Legged Robot Capable of Navigating Unstructured Terrain, 2017 IEEE International Conference on Robotics and Automation (ICRA), 2017, pp. 5532-5538.
Drotman, D., et al., Application-Driven Design of Soft, 3D Printed, Pneumatic Actuators with Bellows, IEEE/ASME Transactions on Mechatronics, 2018, (10 pages).
(Continued)

*Primary Examiner* — Michael Leslie
*Assistant Examiner* — Daniel S Collins
(74) *Attorney, Agent, or Firm* — Eleanor Musick; Torrey Pines Law Group PC

(57) ABSTRACT

A pneumatic circuit for controlling the activation of a robot with inflatable chambers includes at least one ring oscillator formed from a plurality of valves connected in series to selectively admit fluid pressure to inflate and deflate the chambers. Sequential actuation of the valves induces sequential bending and rotation of combinations of the chambers to effect motion. A switching valve changes the actuation sequence of the oscillator valves to change the direction of motion.

37 Claims, 12 Drawing Sheets

(56) References Cited

OTHER PUBLICATIONS

Drotman, D., et al., Electronics-free pneumatic circuits for controlling soft-legged robots, Science Robotics, Feb. 17, 2021, pp. 1-12, vol. 6.

Hermes, M., et al., Bioinspired Shape-Changing Soft Robots for Underwater Locomotion: Actuation and Optimization for Crawling and Swimming, Springer Nature Switzerland AG, 2021 pp. 1-32.

Kalisky, T. et al., Differential Pressure Control of 3D Printed Soft Fluidic Actuators, 2017 IEEE/RSJ International Conference on Intelligent Robots and Systems (IROS), Vancouver, BC, Canada, 2017, pp. 6207-6213,.

Ortiz, D., et al., Soft Robot Actuation Strategies for Locomotion in Granular Substrates, IEEE Robotics and Automation Letters, Jul. 2019, pp. 2630-2636, vol. 4.

Polygerinos, P., et al., Soft Robotics: Review of Fluid-Driven Intrinsically Soft Devices; Manufacturing, Sensing, Control, and Applications in Human-Robot Interaction, Advanced Engineering Materials, 2017, pp. 1-22.

Preston, D.J., et al., A soft ring oscillator, Science Robotics, Jun. 26, 2019, pp. 1-9, vol. 4.

Schmitt, F., et al., Soft Robots Manufacturing: A Review, Frontiers in Robotics and AI, Jul. 31, 2018, pp. 1-17, vol. 5.

Schultz, J., et al., What Is the Path Ahead for Soft Robotics, Soft Robotics, 2016, pp. 159-160, vol. 3.

Wang, J., et al., Control Strategies for Soft Robot Systems, Advanced Intelligent Systems, 2022, pp. 1-27, vol. 4.

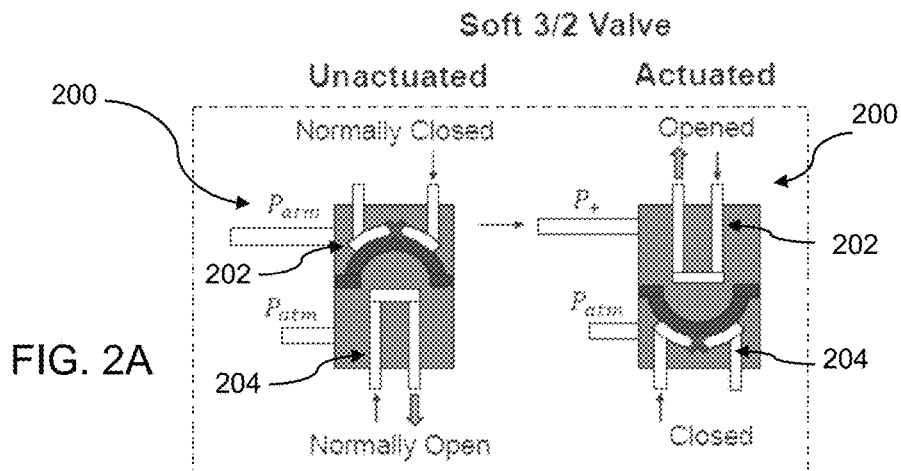
FIG. 2A
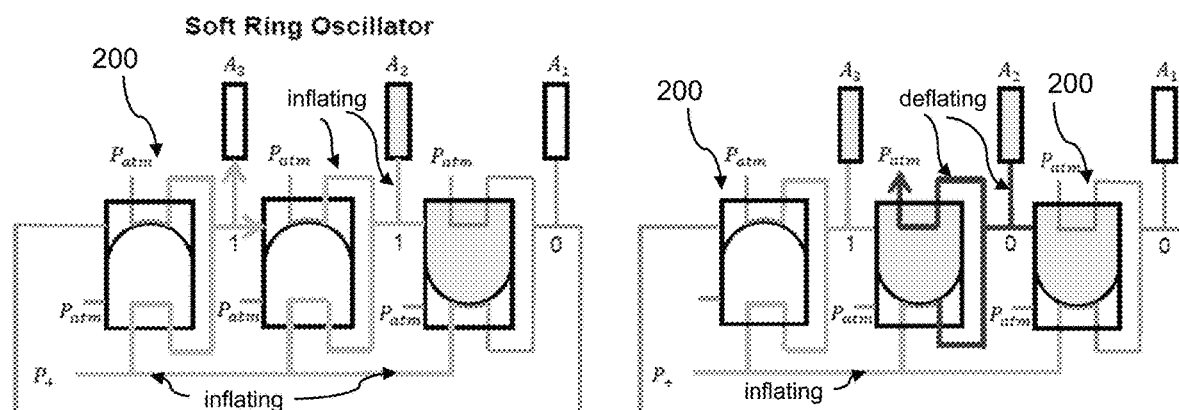
FIG. 2B
FIG. 2C
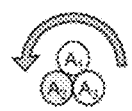
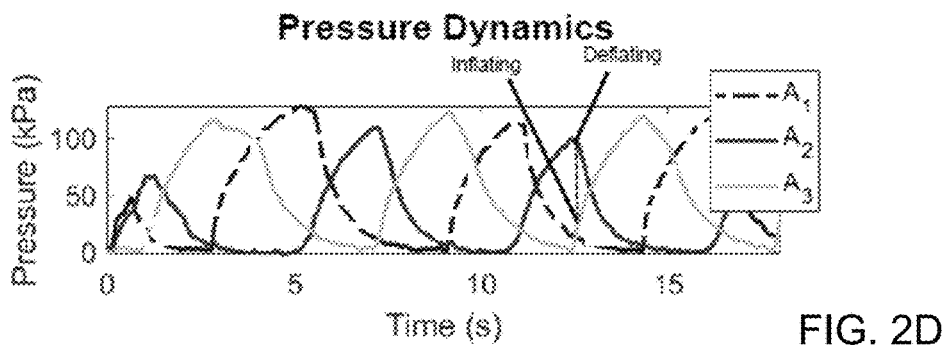
FIG. 2D

Phase Controller

ELECTRONICS-FREE PNEUMATIC CIRCUITS FOR CONTROLLING A ROBOT

RELATED APPLICATIONS

This application claims the benefit of the priority of Provisional Application No. 63/301,983, filed Jan. 21, 2022, which is incorporated herein by reference in its entirety.

GOVERNMENT RIGHTS

This invention was made with government support under Grant N00014-18-1-2277 awarded by the Office of Naval Research. The government has certain rights in the invention.

FIELD OF THE INVENTION

The present invention relates to fluidic circuits for controlling activation and operation of a robot.

BACKGROUND

Industrial robots are fast and precise systems, based on rigid-body mechanisms, which ensure high throughput in the production of manufactured goods. The further development of robotic manufacturing now relies on the integration of workers in the manufacturing systems, allowing to perform tasks that require cognitive capacities still beyond the reach of artificial systems. In this context, collaborative manipulation has been a noticeable evolution in recent years. As robotic systems become increasingly integrated into daily lives, there is a growing need for robots that can safely work and interact with humans. Industrial robots of a new type have appeared, with design and control strategies focused on the ability to perform safe physical human-robot interactions. In parallel, the development of flexible systems in robotics, e.g., serial elastic actuators, has also contributed to the emergence of new mechanisms, with similar safety and interaction objectives. The development of new materials and advanced manufacturing techniques has led to an interest in robotic systems made of soft materials. A key goal is to endow robots with bioinspired capabilities that permit adaptive, flexible interactions with unpredictable environments.

The concept of "morphological computation" is built on observations of how the mechanical form of biological systems can provide the computational ability that reduces the complexity of a controller. In many vertebrates, a central pattern generator (CPG) generates signals that control the movements of peripheral limbs. In the example of swimming, the brain only needs to control the start signal and control the swimming pace, while specific movements of the body are determined by local feedback loops formed by peripheral nerves throughout the body. Inspired by the CPG, the legged robot, whether soft or rigid with rhythmic movements, can be controlled by fewer input signals than the quantity of the legs. Since morphological computing relies on the dynamic coupling between components, soft materials are an asset for morphological computing approaches.

Soft robots offer several useful characteristics, including (i) collaboration (safety and compatibility with humans and animals), (ii) the ability to conform to their surroundings and to objects with which they interact, (iii) simplicity and low cost, (iv) ease of sterilization for medical and food applications, (v) high cycle lifetime, and (vi) resistance to damage by impact. Fluid-driven soft actuators function by pressurizing elastomeric channels and chambers whose geometry is designed to direct motion, but each actuator usually requires hard valves and electronic components for control (typically hard solenoid valves that open and close in response to electronic signals). Actuation schemes include both external hard valves with pneumatic tethering and internal hard valves that avoid tethering but result in devices that are not completely soft. Prior pneumatically or hydraulically powered soft robots that use rhythmic motion to achieve locomotion such as walking, crawling, rolling, swimming, peristaltic digging, or jumping have been primarily controlled by pumps and/or solenoid valves connected to an electronic microcontroller. Temporally coordinated oscillation of multiple sources of pressure has previously required many hard valves. For example, a modified version of an open-source fluidic control board has been used to control the movement of a soft-legged robot. Basic soft valves have begun to be incorporated directly into soft devices. Closed volume actuation systems (e.g., pneumatic or hydraulic pistons) have also used to supply both positive and negative pressure for controlling soft robotic systems. In one approach, unidirectional check valves have enabled simple control of gas flow in a soft ""jumper"" powered by combustion, and microscale valves periodically inflated and deflated the arms of a soft, octopus-like structure, but the scope of these applications is small. More recent work has enabled temporally coordinated actuation of multiple components using a single pneumatic on/off signal by taking advantage of the fluidic resistance between components, however, control of this on/off signal still requires hard infrastructure, and cyclic or repeated actuation requires continuous control. Additional significant challenges for fluidic soft robots are the size and the cost of the components (e.g., electronics, pumps, and valves) required for their actuation and control. Because at least one pump or valve is required per actuated DoF (degree of freedom), the size and cost of these components place a lower limit on the size of soft robots and an upper limit on the number of actuated DoFs.

One approach to address these limitations is the use of fluidic control circuits for soft robots. In these circuits, simple fluidic components, e.g., microfluidic valves, may be used to replace relatively large and expensive electromagnetic components such as solenoid valves. To reduce the cost and complexity of soft machines and to enable applications in environments at risk of spark ignition (e.g., in underground mines), the need remains for such fluidic circuits for controlling electronics-free soft robots. The present invention is directed to such a need.

SUMMARY

According to embodiments of the present invention, fluidic circuits are used to control the activation of chambers within a soft robot. In applications where activation of the robot is intended to effect locomotion, these circuits enable the robot to change direction and navigate around obstacles by employing a soft ring oscillator with soft valves to generate rhythmic motions, which were acted on by additional control elements to semi-autonomously adjust the walking gaits. Where the limbs are legs configured for walking, the walking gaits can be switched either from a manual controller or based on sensor input.

In one implementation, a quadruped robot employing the inventive fluidic circuits has four pneumatically actuated soft limbs. Each limb has three parallel chambers enabling multi-directional bending. The multi-directional bending provides the actuated degrees of freedom required to lift the limbs over obstacles. The flexible legs can bend and twist when interacting with the environment. The limbs are attached to a rigid robot body in the shape of an X and at a 45-degree angle downwards relative to the body plane of the robot. Each of the limbs can be actuated with a pneumatic or hydraulic actuation system.

In exemplary embodiments, the valves within the inventive circuits regulate flow by closing and opening channels using an elastomeric membrane. The state of the valve switches when an applied pressure causes a snap-through instability in the elastomeric membrane. The logical state of the membrane is pneumatically controlled using the same pressure source that actuates the limbs of the robot.

In some embodiments, additional improvement is obtained by using a mechanism to selectively switch the connections between two of the mirrored pairs of chambers and two of the ring oscillator valves, resulting in the ability to reverse the "walking" sequence. The connections between the oscillator and the pneumatic chambers are switched using a soft 4/2 bistable control valve that is analogous to a latching double-pole, double-throw (DPDT) switch. This valve controls the flow between four ports by switching between two different states (corresponding to counterclockwise or clockwise rotation of the limbs). This valve arrangement switches the state of an elastomeric membrane similar to that used in the 3/2 soft valves of the ring oscillator, except with two (rather than one) fluid lines connected to either side of the membrane. As a result, the sequence of chamber pressurization reverses when pressure is applied to switch the state of the 4/2 valve (either manually, or with a fluid). Because the membrane is bistable, the valve does not require continuous pressure to remain in a state.

In some embodiments, a sensor mounted on the robot is used to detect contact with an obstacle and reverse the direction of robot's motion. This sensor, formed from an elastomeric membrane connected by a fluidic transmission to a 4/2 bistable control valve, switches the state of the valve when pressure is detected by the soft membrane.

Analogous to biological gait control, the disclosed fluidic circuits generate oscillatory signals, and adapt the oscillatory signals in response to sensor input to generate responsive gaits. The inventive approach for controlling soft systems enables robots to interact with their environment and make decisions based on these interactions without requiring electronics. The innovations that enable this approach include: i) pneumatic circuits composed of a small number of fluidic control components capable of generating gaits for legged locomotion, ii) a new pneumatic memory element (designed to mimic a double-pole double-throw switch) to enable gait selection, and iii) an onboard tactile sensor to semi-autonomously switch gaits based on input from the environment. Together, these innovations provide simple fluidic circuits for controlling electronics-free soft legged robots.

In one aspect of the invention, a pneumatic circuit for controlling activation of a robot having inflatable chambers configured for inflation using fluid from a fluid source, where the circuit includes: a plurality of fluid channels, each channel configured to communicate fluid from the fluid source to the inflatable chambers; at least one ring oscillator comprising a plurality of valves connected in series, the at least one ring oscillator in fluid communication with the inflatable chambers, each valve configured to control flow of fluid between the fluid source and at least one inflatable chamber to switch a state of the at least one inflatable chamber between inflated and deflated, wherein actuation of the plurality of valves in a first order induces inflation of the inflatable chambers in a first sequence; and at least one control valve in fluid communication with the at least one ring oscillator, the at least one control valve configured to modify an order of actuation of the plurality of valves to at least one second sequence different from the first sequence.

The robot may include couplets of inflatable chambers where the at least one ring oscillator comprises a plurality of ring oscillators wherein a ring oscillator is associated with each couplet. In some embodiments, one ring oscillator of the plurality is in communication with a phase controller to introduce a one-time offset in initiation of activation of one of the couplets. The at least one control valve may be one control valve for each couplet.

Where the robot is configured for movement, the first sequence effects motion of the robot in a forward direction and the at least one second sequence effects motion in one or more of a reverse direction, a clockwise direction and a counterclockwise direction. The inflatable chambers may be tubing bundled in parallel to define pairs of limbs extending from a robot body in a diagonal arrangement, where actuation of the plurality of valves in the first sequence induces sequential bending and rotation of the limbs to effect walking. The pairs of limbs may be mirrored, where actuation of the plurality of valves in the first order causes a first pair of limbs to rotate in a first direction followed by sequential actuation of the plurality of valves in the second order causes a second pair of limbs to rotate in a second direction different from the first direction. The at least one ring oscillator may be at least two ring oscillators, where each pair of limbs is controlled by a separate ring oscillator.

Each valve may be a three port, two-state valve. The control valve may be a four port, bistable valve. In some embodiments, each valve may include an elastomeric membrane, wherein the valve is configured to regulate flow by closing and opening channels using a snap-through instability in the membrane.

In some embodiments, the control valve may be a fluid-based sensor configured for detecting contact with an object and autonomously changing the order of actuation in response to detected contact. The fluid-based sensor may include an elongated fluid channel, the fluid channel having a distal end and a proximal end, the proximal end connected to the at least one control valve; a membrane disposed at the distal end of the fluid channel; and a fluid retained within the channel, where the fluid is configured to transmit pressure from the membrane to the at least one control valve when the membrane contacts the object, wherein the transmitted pressure changes a state of the at least one control valve to cause the at least one ring oscillator to reverse a walking direction of the robot. The fluid may be pre-pressurized to a pressure below but close to a point of instability of the at least one control valve.

In other embodiments, the control valve may be a non-electronic manual controller connected to the robot via fluid tubing, the controller comprising an array of bubble membranes, wherein depressing a selected bubble membrane applies switches valve states within the at least one ring oscillator.

In some embodiments, the fluid source for the robot is a pressurized gas canister, which may be mounted on a body of the robot. The fluid may be carbon dioxide. In other embodiments, fluid source may be an external source comprising an air tank or pump, and further comprising an umbilical tubing connecting the robot and the external source.

In another aspect of the invention, a pneumatic circuit for controlling activation of a robot having a plurality of inflatable chambers where each chamber configured for inflation using fluid from a fluid source, the circuit includes: a plurality of fluid channels, each channel configured to communicate fluid from the fluid source to the plurality of chambers; at least one ring oscillator comprising a plurality of valves connected in series, each valve configured to control flow of fluid into at least one inflatable chamber to switch a state of the at least inflatable chamber between inflated and deflated, wherein sequential actuation of the plurality of valves induces sequential inflation or deflation of the plurality of chambers; and at least one control valve in fluid communication with the at least one ring oscillator, the at least one control valve configured to modify an order of actuation of the plurality of valves to at least one second sequence different from the first sequence.

The plurality of chambers may be tubing bundled in parallel to define at least two pairs of limbs extending from a robot body in a diagonal arrangement, each limb comprising n chambers having a proximal end and a distal end, wherein the proximal end is connected to the robot body and the distal end has a foot disposed thereon. The at least two pairs of limbs may include two mirrored couplets, where sequential actuation of the plurality of valves in a first order causes a first couplet to rotate in a first direction followed by sequential actuation of the plurality of valves in a second order causes a second couplet to rotate in a second direction. Sequential actuation of the plurality of valves in reverse of the first order causes a first couplet to reverse from the first direction followed by sequential actuation of the plurality of valves in a reverse of the second order causes the second couplet to reverse from the second direction. The plurality of valves may be connected to induce a phase offset between the first couplet and the second couplet. The phase offset may be controlled by connecting the chambers of the second couplet to the valves in an order that differs from a connection order of the inflatable chambers of the first couplet. A bistable control valve may be connected to each pair of limbs, where the bistable control valve is configured to switch a direction of rotation of each limb individually between counterclockwise and clockwise.

In some embodiments, each valve includes an elastomeric membrane, where the valve is configured to regulate flow by closing and opening channels using a snap-through instability in the membrane. Each valve may be a three port, two-state valve. The at least one control valve may be a four port, bistable valve.

The plurality of inflatable chambers may be n chambers, where n is an odd integer of three or more, and the plurality of valves is n valves.

In still another aspect of the invention, a method for controlling motion of a robot having a plurality of inflatable chambers, where each chamber is configured for inflation using fluid from a fluid source, the method includes: providing at least one ring oscillator comprising a plurality of valves connected in series, each valve configured to control flow of fluid from a fluid source into at least one chamber to switch a state of the at least one chamber between inflated and deflated, wherein sequential actuation of the plurality of valves induces motion in a first direction; and switching an order of sequential actuation of the plurality of valves to change motion to a second direction. In some embodiments, switching is initiated autonomously by a bistable control valve in fluid communication with a sensor membrane, where the bistable control valve changes the order of sequential actuation when the sensor membrane contacts an object. In other embodiments, switching is initiated by depressing a membrane on a manual controller.

The plurality of chambers may be tubing bundled in parallel to define at least two pairs of limbs extending from a robot body in a diagonal arrangement, each limb comprising n chambers having a proximal end and a distal end, wherein the at least two pairs of limbs comprise two mirrored couplets, and wherein sequential actuation of the plurality of valves in a first order causes a first couplet to rotate in a first direction followed by sequential actuation of the plurality of valves in a second order causes a second couplet to rotate in a second direction. Sequential actuation of the plurality of valves in reverse of the first order causes a first couplet to reverse from the first direction followed by sequential actuation of the plurality of valves in a reverse of the second order causes the second couplet to reverse from the second direction. The plurality of valves may be connected to induce a phase offset between the first pair of limbs and the second pair of limbs. The phase offset may be controlled by connecting the inflatable chambers of the second pair of limbs to the valves in an order that differs from a connection order of the inflatable chambers of the first pair of limbs.

BRIEF DESCRIPTION OF THE DRAWINGS

FIGS. 2A-2C illustrate the soft ring oscillator concept, where FIG. 2A shows each of the valves acting as an inverter by switching the normally closed half (top) to open and the normally open half (bottom) to closed, as shown in FIGS. 2B and 2C, respectively; FIG. 2D provides a representative plot of the pressure at the three nodes of the oscillator when actuated at 150 kPa.

FIG. 3A shows a dual-purpose "three valve ring oscillator circuit" (Circuit 1); FIG. 3B is a schematic of the quadruped robot controlled by Oscillator A and Oscillator B when Oscillator B has a phase offset of $\varphi^0$; FIG. 3C is a box plot depicting the velocity of the robot for four different phase offsets; FIG. 3D shows the "parallel oscillator circuit" (Circuit 2); FIG. 3E plots delay adjustment with resistance of an element R; FIG. 3F displays representative measurement of the pressure in the three chambers of the delayed oscillator.

FIG. 5A shows the output sequences of a three-valve ring oscillator circuit controlled by two 4/2 bistable valves and FIG. 5B shows control with four 4/2 bistable valves.

FIG. 6A is a schematic of a robot with a single pressure supply line tethered to a manual controller;

FIG. 6B is a photographic image of the robot of FIG. 6A with walking directions indicated;

FIG. 6C shows the X-Y position of a single point on the robot body from video tracking software; and FIGS. 6D-6F are photos and corresponding diagrams demonstrating manually controlled obstacle avoidance.

FIG. 7A shows the robot walking toward an obstacle, FIG. 7B shows the moment when the sensor contacts the obstacle, and FIG. 7C shows the robot reversing direction after contact.

DETAILED DESCRIPTION OF EMBODIMENTS

The exemplary embodiments described herein are primarily directed to pneumatic, i.e., air or gas pressure, activation. These examples are not intended to be limiting, and those of skill in the art will recognize that hydraulic, i.e., non-gas, fluids, may also be used to apply actuating pressure. Accordingly, for purposes the present invention, description of "pneumatic circuits" and "pneumatic operation" are intended to include any fluidic pressure material that may be appropriate for use in soft robots.

As used herein, "soft robot" (also "robot"), refers to a device that employs a fluidic actuator such as an expandable bladder that may be quickly inflated with compressed fluid (gas or liquid) to modify its shape or other physical characteristics and/or to generate an impulse needed for movement and interaction through expansion, contraction, extension, deformation, flexion, undulation, rotation, twisting, or other change. A soft robot may, but need not, employ biomimicry, and may be used to perform a wide range of functions, including, but not limited to locomotion, grasping, pumping, crawling, climbing, walking, swimming, in fields including but not limited to medicine, e.g., artificial organs, scientific research, exploration, mining, agriculture, manufacturing, entertainment, hazard and emergency response, and more.

As used herein, a "pneumatic valve" (also, "valve") is a device that is used to control the flow of fluid by starting, stopping, or regulating flow. In the exemplary embodiments described herein, a valve is controlled by an elastomeric membrane that switches the airflow state when an applied pressure causes a snap-through instability in the membrane. As will be apparent to those of skill in the art, other valve mechanisms may be used in conjunction with the pneumatic circuits described herein, including, but not limited to, piston, poppet, rotary, ball, pinch, needle, diaphragm, and other types of pneumatic valves that are capable of switching the state of one or more connected expandable bladder.

Figure 1A:
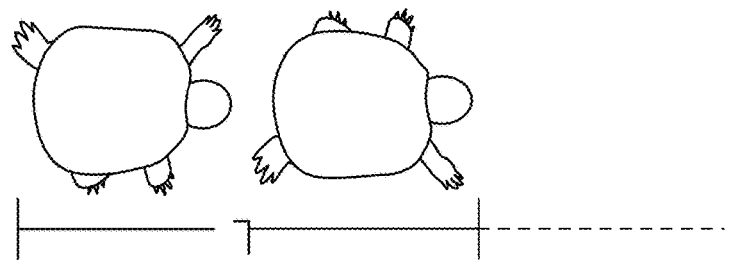
FIG. 1A is a cartoon of an African sideneck turtle exhibiting a diagonal couplet walking gait.

The present invention relates to pneumatic circuits composed of fluidic control components that are designed to control the gait of a walking robot without electronics. FIGS. 1A-1F illustrate elements of untethered robot operation according to an embodiment of the invention. This approach is inspired by observing, and attempting to mimic, the CPG of an African sideneck turtle, which exhibits a diagonal couplet walking gait. A partial gait sequence for the turtle is shown in FIG. 1A.

To demonstrate the use of the inventive pneumatic control system on a soft legged robot, a soft quadruped was designed with three pneumatic chambers per leg based on the 3D-printed actuator disclosed by D. Drotman, et al., in Robotics and Automation (ICRA), 2017 IEEE International Conference on (IEEE 2017), which is incorporated herein by reference. The four limbs of the robot emanated from the robot body with two perpendicular vertical planes of symmetry. Each limb was angled downward at a 45° angle relative to the horizontal, and composed of three parallel, connected pneumatic cylindrical chambers with bellows. When a combination of chambers is inflated, chambers maintained at a lower pressure constrain axial extension, causing the actuator to bend. Each chamber is controlled independently by varying its internal pressure to achieve control of bending about two axes. When a chamber is pressurized, the limb bends in the opposing direction (FIG. 1E). The three chambers of each limb provided the multi-axis bending required for walking. To control the gait sequences without electronics, soft pneumatic control circuits were used. The basic rhythmic motion of a pair of legs was generated with a soft ring oscillator acting as a pneumatic CPG.

Soft ring oscillators can produce continuous oscillatory signals with minimal control inputs, needing only a constant pressure source acting both as signal (i.e., indicating when to oscillate) and source of energy. To evaluate the consistency of the periodic signal produced from the soft ring oscillator, we measured the pressure in one of the leg chambers during 10 oscillatory cycles and plotted them together vs. the time since the start of each oscillation. Over the oscillation period, the average standard deviation in the pressure between cycles was 9.4 kPa, with a worst-case standard deviation of 15.5 kPa (19%) at t=1.8 s.

Figure 1B:
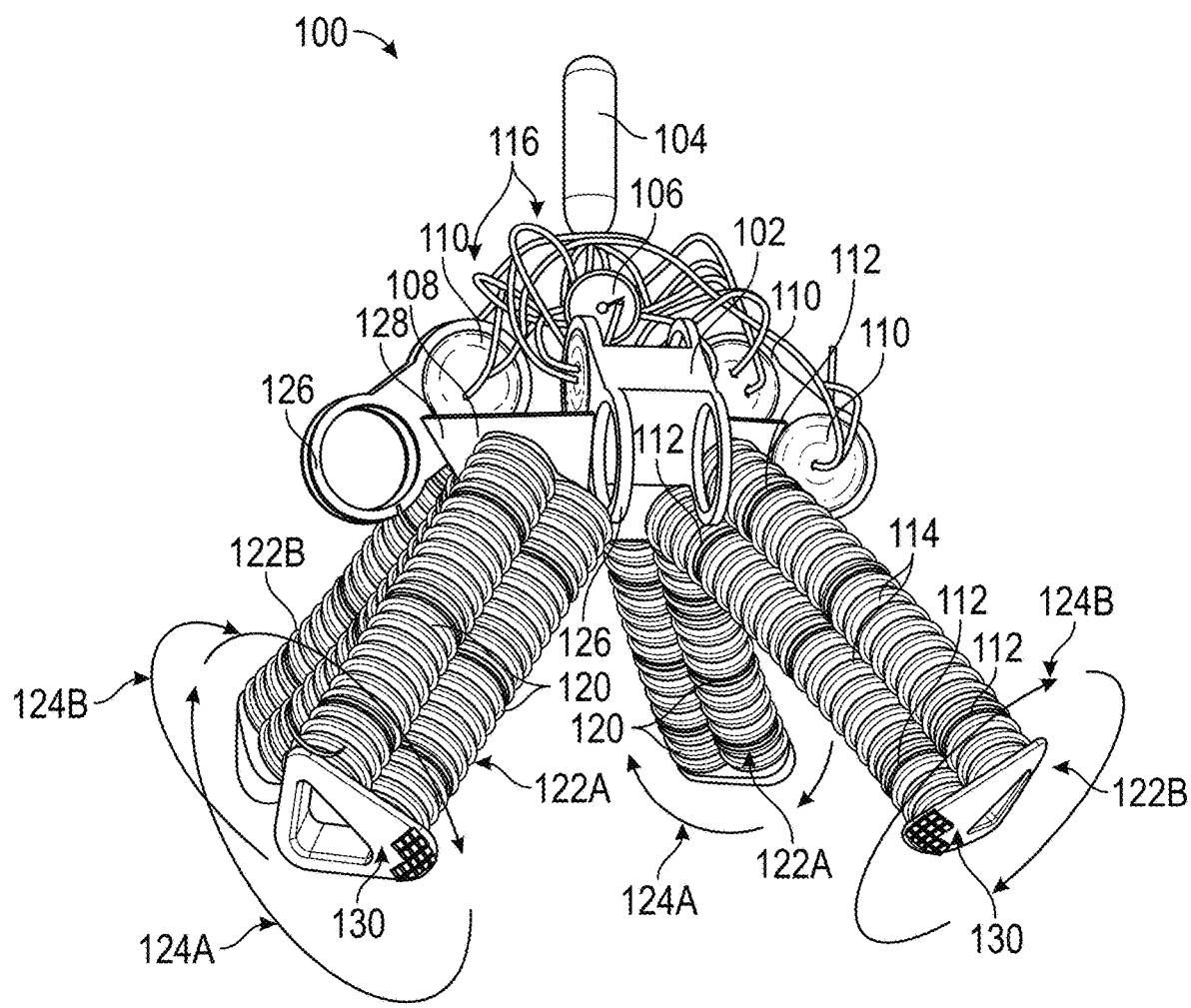
FIG. 1B is a photograph of the untethered quadruped robot according to an embodiment of the invention.

FIG. 1B is a photograph of an untethered quadruped robot 100 employing the inventive control scheme. In the exemplary implementation, the onboard soft valves are powered by a $CO_2$ canister 104 supported on the robot body 102. In other embodiments, the pressure source may be external, e.g., a pump or canister connected via an umbilical tubing, or an on-board pump may be included in an assembly configured for larger applications. Further, the pressure fluid is not limited to $CO_2$—other gases or fluids may be used.

To fabricate the soft legged quadruped 100, commercially available polyvinyl chloride (PVC) cylindrical bellows (Con-A-Flex® tubing, Teleflex Medical Inc.) were used to form the pneumatic chambers that act as legs, providing extrinsic compliance (to allow bending) and the intrinsic stiffness needed to tolerate sufficiently high internal pressures for efficient operation. These materials enabled the robot to be actuated with a maximum internal pressure of 170 kPa (compared to 110 kPa pressure for the 3D-printed legs described by Drotman, et al. (2017). As shown in FIG. 1B, sections 114 of tubing are held together with retaining rings 112 to form the legs. The robot body 102 and retaining rings 112 were 3D printed out of polylactic acid (PLA) (MakerBot® Replicator® 2, Stratasys, Inc.). A commercial multi-material 3D printer (Connex3™, Stratasys, Inc.) was used to print the feet 130 of the robot using a soft material (TangoBlackPlus™, Stratasys, Inc.) for traction, as well as rigid back plates used to mount the legs 120 to the body 102 of the robot (VeroClear™, Stratasys, Inc.).

Body 102 has a truncated X-shape when viewed from the top (see, e.g., FIG. 1G), with angled lower plates 128 from which legs extend radially downward at an angle of approximately 30° to 45° from vertical. Valve support rings 126 extend radially from the center of body 102. Mounted on the upper surface of body 102 is pressure regulator 106, which is connected via tubing to canister 104 to control $CO_2$ pressure for delivery (via tubing 116) to pneumatic valves 110, and inflatable legs 120. Legs 120 (alternatively referred to as "limbs") are formed from sections 114 of corrugated tubing held together with retaining rings 112. In this test set-up, each chamber was formed by sliding retaining rings 112 over the ends of three bellows sections to fit into the grooves. Each of the limbs is configured to be actuated with a pneumatic or hydraulic actuation system. The back plates 108 of the legs were tapped to attach threaded barbed adapters to the pneumatic lines 116. Each of the threaded adapters on the legs are inserted through corresponding holes in the angled lower plates 128 of the robot body with each foot 130 oriented downward, i.e., toward the ground. The base of each leg is glued to the body 102 of the robot. The three chambers used to form a single leg 120 were then press fit and glued onto the feet 130 and back plates 108. Legs 120 are diagonally paired across the body to define two pneumatic circuits, labeled in the figures as "oscillator A" (122A) and "oscillator B" (122B).

Figure 1C:
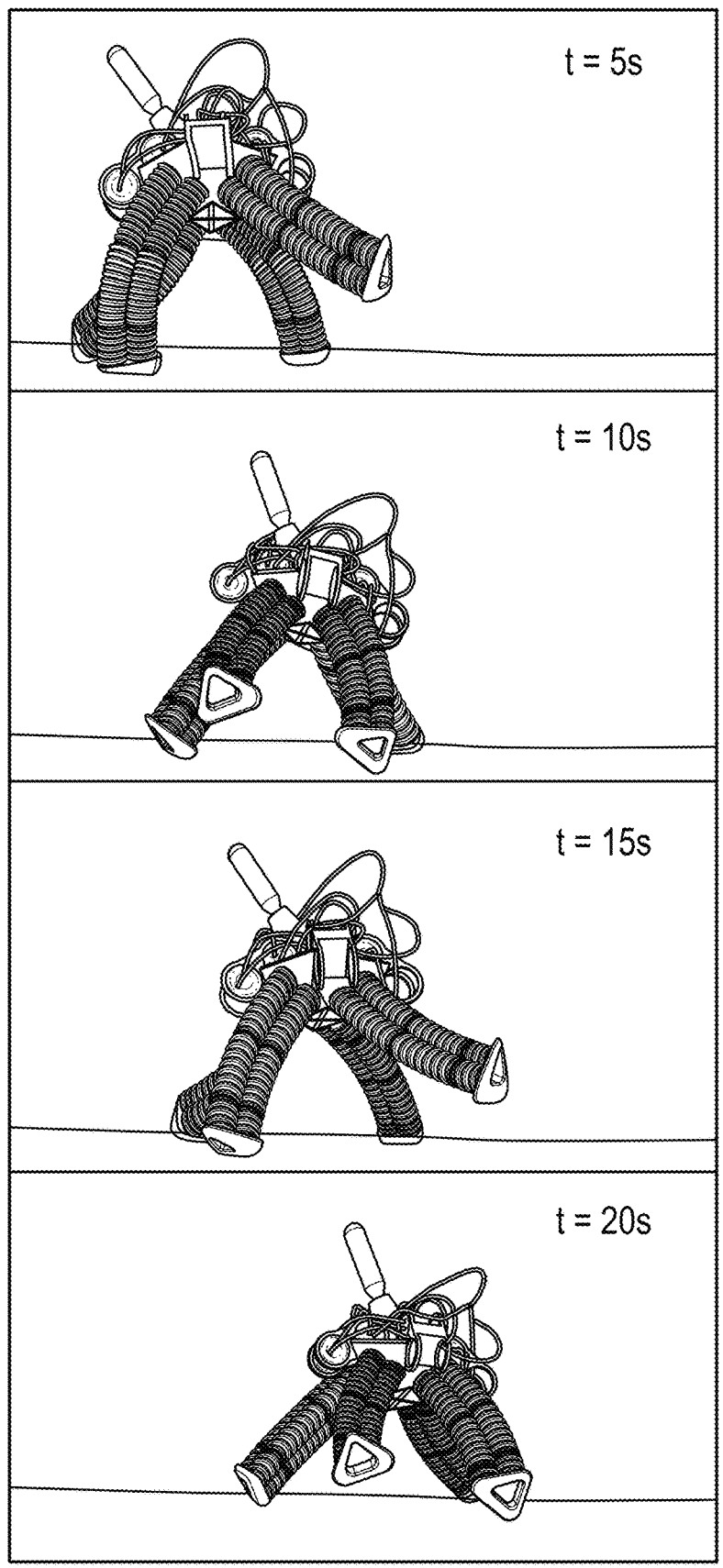
FIG. 1C shows a sequence of frames from a video of the robot of FIG. 1B walking.
Figure 1D:
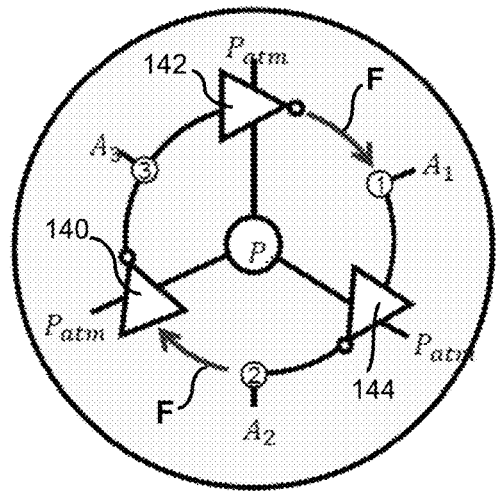
FIGS. 1D and 1E diagrammatically depict a pneumatic logic circuit for rhythmic leg motion for forward and reverse movement, respectively.
Figure 1E:
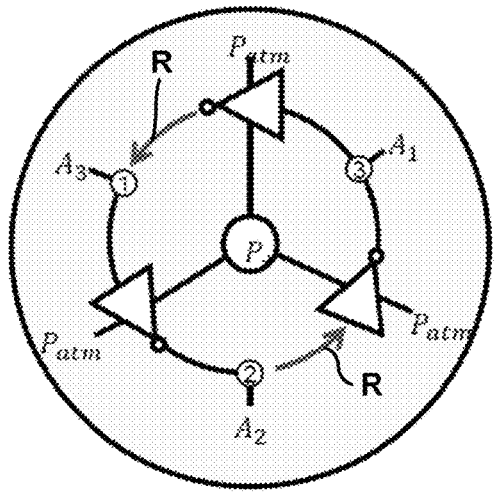
Figure 1F:
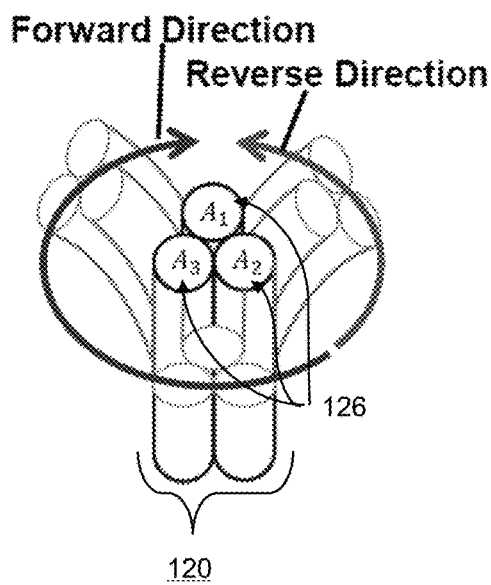
FIG. 1F is a diagram of the legs of the robot.

Referring to FIG. 1F, in the exemplary embodiment, each leg 120 is a bundle of three parallel tubular chambers 126 arranged at 120° around the longitudinal axis of the leg assembly, with the chambers labeled as $A_1$, $A_2$, and $A_3$ for a leg in oscillator circuit A, and, similarly, as $B_1$, $B_2$, and $B_3$ for a leg in oscillator circuit B. The three chambers 126 enable multi-directional bending, providing the actuated degrees of freedom required to lift the limbs over obstacles. The flexible legs can bend and twist when interacting with the environment. The directions of leg motions for forward walking are indicated in FIG. 1B by arrows 124A and 124B, respectively, where the letters match their corresponding oscillator circuits. As will be readily apparent to those in the art, the described use of three chambers within the leg assembly is not intended to be limiting. The inventive approach described herein may be used with additional numbers of chambers, and legs, by adding supporting components.

FIG. 1C provides a sequence of four images from a 15 second video of the robot walking using only the pressurized $CO_2$ canister as a source of energy, with two pneumatic oscillator circuits generating rhythmic leg actuation for forward walking.

Figure 1G:
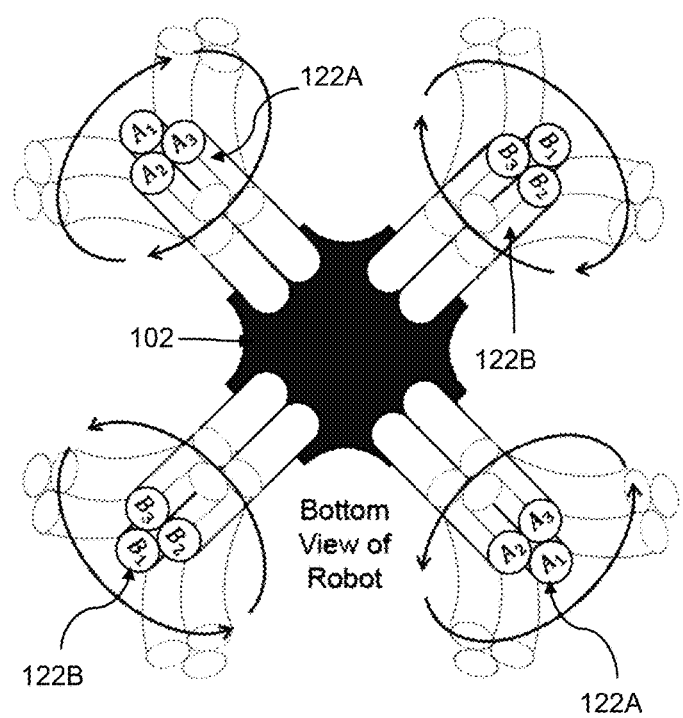
FIG. 1G is a schematic bottom view of the robot.

FIG. 1D diagrammatically depicts a pneumatic logic circuit for rhythmic leg motion. In this example, the three chambers are labeled as $A_1$, $A_2$, and $A_3$, for a leg in oscillator A. Note that, while not shown, a corresponding diagram for a leg in oscillator B would include labeling for $B_1$, $B_2$, and $B_3$. As described in more detail below, each soft valve acts as an inverter. A constant positive pressure source (P+) applied to the three inverter components 140, 142, 144 causes a high-pressure state to propagate around the circuit, with a delay at each inverter. While the input to one inverter is high, the attached actuator (i.e., $A_1$, $A_2$, or $A_3$) is inflated in order of $A_1$-$1^{st}$, $A_2$-$2^{nd}$ and $A_3$-$3^{rd}$. This sequence of high-pressure states causes each pair of legs of the robot to rotate in a direction determined by the pneumatic connections. FIG. 1E is a diagram of a pneumatic log circuit where, by reversing the sequence of activation of the pneumatic oscillator circuit, the attached actuators inflate in a new sequence: $A_3$-$1^{st}$, $A_2$-$2^{nd}$ and $A_1$-$3^{rd}$. FIG. 1F provides an example of the order of activation for each chamber of a leg within oscillator A for rotating forward (clockwise) and reverse (counterclockwise). FIG. 1G is a schematic bottom view of the robot with the directions of leg activation indicated for forward walking.

The soft valves regulate flow by closing and opening channels using an elastomeric membrane. The state of the valve switches when an applied pressure causes a snap-through instability in the elastomeric membrane. The logical state of the membrane is pneumatically controlled using the same pressure source that actuates the limbs of the robot.

Rhythmic motion of a pair of legs can be generated by connecting one port of each valve of a soft ring oscillator to pneumatic chambers of the legs. One set of paired legs (e.g., chambers $A_1$, $A_2$, and $A_3$) is connected to the nodes of the oscillator circuit shown in FIGS. 2A-2C, which generates pressure in the connected chambers. The pressure generated in each chamber during this process is consistent, with an average standard deviation of pressure throughout the cycle of 9.4 kPa.

Soft Valve Fabrication:

The valves are formed of a cylindrical body, two caps and tubing. The body of the soft valves and caps are molded out of a soft polymer (MoldStar™ 30, Smooth-On, Inc.). The polymer is poured into a 3D printed mold made of polylactic acid (PLA, MakerBot® Replicator® 2). The caps act to close off the normally-closed and normally-open cavities of the valve. A silicone adhesive (SilPoxy) is used to affix the caps of the valve to the cylindrical body. Tubes are fed through the side walls of the cylindrical body and the caps to create the inlet, exhaust, and opened/closed airways.

Control Valve Characterization:

The snap-through and snap-back pressures were measured for an individual 3/2 valve, resulting in an average of 35 kPa (s=3 kPa) and 20 kPa (s=2 kPa), respectively. The pressure dynamics were fit to an exponential function (solution to Equation 1 below) to determine a time constant ($\tau$=RC) of 1.32 seconds. The snap-through pressure for an individual bistable 4/2 valve (including tubing on both sides) was measured to be 35 kPa (s=5 kPa).

Soft Ring Oscillator Analysis:

The soft ring oscillator is formed by connecting three three-port, two-state (3/2) control valves in series, where the output from one valve serves as the input to the next valve (see FIGS. 2A-2C). Each soft valve acts as an inverter (i.e., a NOT logic gate) with a time delay. Thus, the soft valves switch the state of each connected chamber from a high (inflated) state to a low (deflated) state, or vice versa. The valves regulate flow by closing and opening channels using a snap-through instability in a hemispherical elastomeric membrane. The valves switch between one of two states when pressure is applied to the surface of the membrane.

The pneumatic soft ring oscillator can be modeled based on analogous electrical components, providing the following relationships for the resistance, capacitance, and pressure dynamics of the valves:

$$\frac{dP}{dt} = \frac{1}{RC}(P_i - P) \tag{1}$$

$$R = R_{tubing} + R_{inverter} \tag{2}$$

$$C = C_{chamber} + C_{inventer} \tag{3}$$

$$R_{tubing} = \frac{128\mu L}{\pi \rho D^4} \tag{4}$$

$$C_{chamber} = \frac{V_0 M}{R_u T} \tag{5}$$

where µ is the dynamic viscosity of air, L is the length of the tubing, ρ is the density of air, D is the inner diameter of the tubing, $C_{inverter}$ is capacitance of the inverter, $R_{inverter}$ is resistance of the inverter, $R_{tube}$ is the resistance of added tubing, Vo is the volume of air in the reservoir, M is the molar mass of the air, $R_u$ is the universal gas constant, T is the temperature of the air, and $P_i$ can either be P+(supply pressure) on inflation or $P_{atm}$ on deflation.

The time delay propagated through each valve $t_p$ can be determined based on the two states of the membrane in the valve $$t_p = RC\left[\ln\left(\frac{P_{atm} - P_+}{P_{st} - P_+}\right) + \ln\left(\frac{P_+ - P_{atm}}{P_{sb} - P_{atm}}\right)\right] \quad (6)$$

where $P_{st}$ is the snap-through pressure of the membrane, $P_{sb}$ is the snap-back pressure of the membrane, and the supply pressure is P+. If the tubing, chambers, and valves in the soft ring oscillator are the same, the period of oscillation is $T=nt_p$ where n is the total number of valves. The values of R and C can be tuned to adjust the time required for pressure to propagate through each valve, hence, R and C can be used to adjust the period and timing of a soft ring oscillator.

Soft Ring Oscillator Characterization:

The pressure in the oscillator was measured at the nodes connected to one set of diagonally connected legs and the data processed with a ten point moving average sampled at 40 Hz for the case of free oscillation. The average period for one complete cycle of the soft ring oscillator actuated at 150 kPa was 8.13 s (s=0.12 s). The nodal pressures were measured with pressure sensors (100PGAA5, Honeywell International Inc.). The period between the peak pressures measured in each sequential node was 2.73 s on average (s=0.12 s). Differences between the pressure signals were due to slight variations in the fabrication of each valve.

For a soft ring oscillator formed of bistable valves, a high frequency spike occurs in the pressure when it reaches the critical snap-back and snap-through pressures of the membrane. In the inventive oscillator, the pairs of limbs of the robot are configured to store large volumes of air (i.e., high capacitance), effectively acting as low-pass filters to filter high frequency pressure changes.

Referring to FIG. 2A, each of the valves 200 acts as an inverter by switching the normally closed half (top 202) to open and the normally open half (bottom 204) to closed. The soft ring oscillator is designed to sequence inflation and deflation of different chambers of the robot (e.g., Oscillator A: $A_1$, $A_2$, and $A_3$). The soft ring oscillator actuates the chambers in sequence, causing the limbs to rotate in a circle. To illustrate a sample sequence, immediately before the moments shown in FIG. 2B and after FIG. 2C, the pressure in chamber $A_3$ increases beyond the valve snap-through pressure ($P_{st}$=35 kPa). In FIG. 2B, both $A_2$ and $A_3$ are inflating. In FIG. 2C, once the pressure in $A_3 > P_{st}$, the exhaust for $A_2$ opens and $A_2$ begins deflating as depicted. FIG. 2D provides a representative plot of the pressure at the three nodes of the oscillator when actuated at 150 kPa. The moments depicted in FIGS. 2B and 2C are labeled on this plot as inflating and deflating, respectively.

The gait for the quadruped can be defined by the duration of inflation/deflation for the three chambers of each leg of the robot. Rather than individually addressing all twelve chambers, the control problem can be simplified by pairing the similar chambers on the legs diagonally across from one another (see, e.g., FIG. 3B). Here, the three paired chambers of one diagonal pair are referred to as $A_1$, $A_2$, and $A_3$, and the three paired chambers of the other diagonal pair as $B_1$, $B_2$, and $B_3$.

Timed actuation of the paired chambers $A_1$, then $A_2$, then $A_3$ causes the first pair of legs to rotate in the same direction, causing the robot to take a diagonal step. Similarly, the sequence $B_1$, then $B_2$, then $B_3$ causes the robot to step in a perpendicular direction.

Reversing the sequence of actuation of the chambers in a leg pair (e.g., $A_1$, $A_3$, and $A_2$), causes the robot to move in the opposite direction. Thus, with linear combinations of forward or reverse steps with the diagonal leg pairs, the robot is able to walk in any direction. Rotation is also possible by reversing the direction of rotation of one leg in a pair with respect to the other. Thus, a simplified gait control system for omnidirectional locomotion requires the diagonal leg pairs to be able to rotate clockwise and counterclockwise. The inventive pneumatic networks are able to achieve rhythmic gait motions with only a single pressure supply line.

Connections between two of the mirrored pairs of chambers and two of the ring oscillator valves are configured to selectively switch, resulting in a reversed sequence. Reversal is simplified by the fact that the robot was implemented with three pneumatic chambers per leg. As will be readily apparent to those in the art, additional chambers may be used but will require additional valves and corresponding connections.

In some embodiments, the connections between the oscillator and the pneumatic chambers may be switched using a soft 4/2 bistable control valve, which is analogous to a latching double-pole, double-throw (DPDT) switch. This valve controls the flow between four ports by switching between two different states (corresponding to counterclockwise or clockwise rotation of the limbs). Such a valve arrangement switches the state of an elastomeric membrane similar to that used in 3/2 soft valves of the ring oscillator, except with two (rather than one) fluid lines connected to either side of the membrane. As a result, the sequence of chamber pressurization reverses when pressure is applied to switch the state of the 4/2 valve (either manually, or with a fluid). Because the membrane is bistable, the valve does not require continuous pressure to remain in a state.

The soft ring oscillator arrangement discussed above with reference to FIGS. 2A-2C generates continuous oscillatory motion for a single pair of legs. For a quadruped, coordination of two sets of diagonally connected pairs of legs is required to produce a diagonal couplet gait. To control both sets of legs, two alternative pneumatic control circuits were evaluated: a dual-purpose three valve ring oscillator connected to both leg pairs, referred to herein as "Circuit 1", and a circuit consisting of two three-valve ring oscillators in parallel (six valves to control the oscillation, one valve for phase control), referred to as "Circuit 2". The discussion below compares and contrasts these circuit options.

Figure 3A:
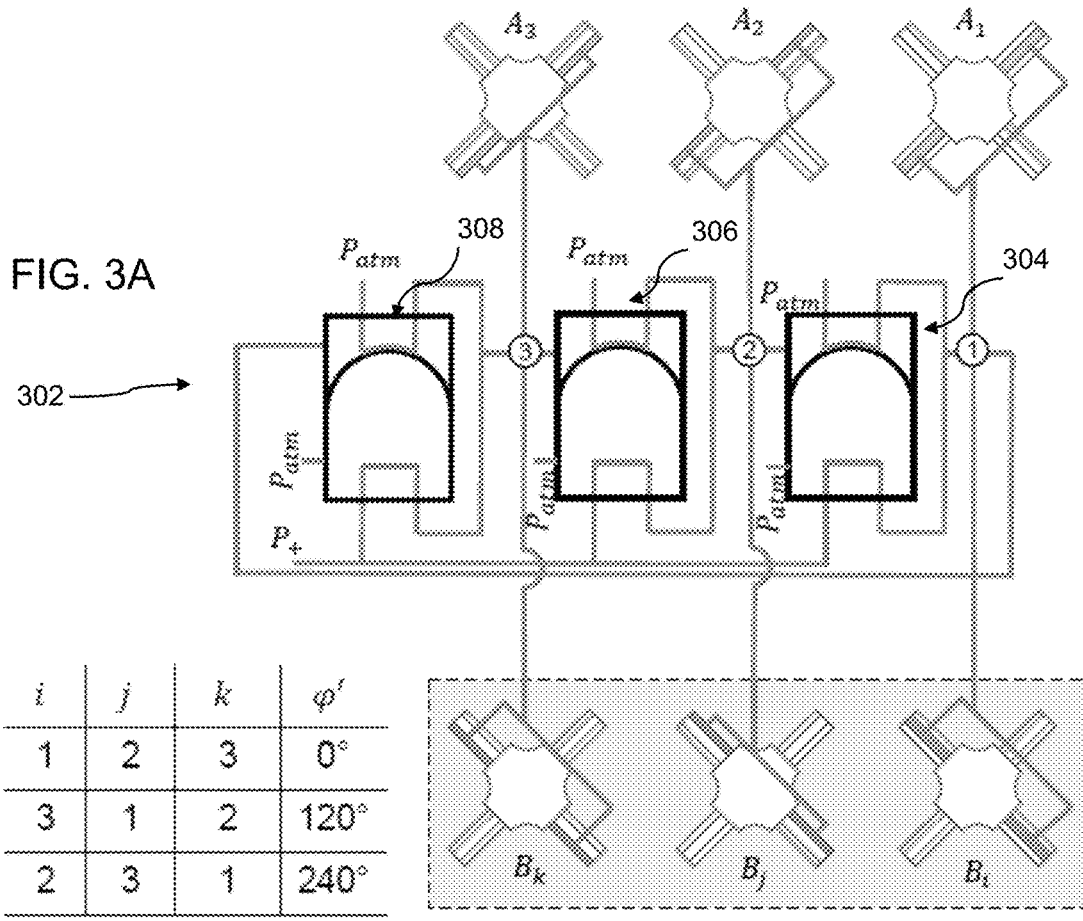
FIGS. 3A-3F illustrate simple circuits for generating a diagonal couplet gait, where
Figure 3B:
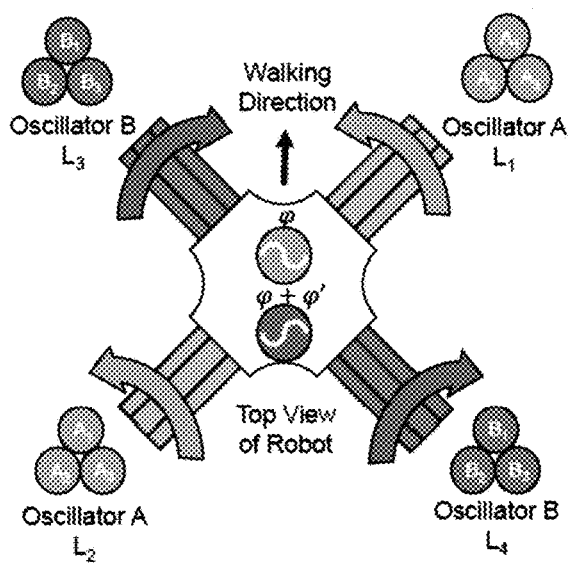

Circuit 1: Dual-purpose three-valve ring oscillator circuit: FIG. 3A provides a diagram of Circuit 1, the dual-purpose "three valve ring oscillator circuit" 302. Circuit 302, with valves 304, 306, 308, controls the pressure in twelve chambers, with four chambers (two mirrored pairs) connected to each inverter for a phase offset of 0°, 120° and 240° between the rotation of each diagonal leg pair (depending on the positions of the second pair of chambers relative to the first). FIG. 3B is a schematic of an exemplary quadruped robot controlled by Oscillator A and Oscillator B when Oscillator B has a phase offset of $\varphi^0$.

Circuit 1's approach uses a ring oscillator with three inverter valves to actuate both leg pairs simultaneously, but with a phase offset between the leg rotations. Phase offset is achieved by connecting one set of chambers (e.g., $A_1$, $A_2$, and $A_3$ from the first leg pair) to inverters at nodes 1, 2, and 3, respectively, and also connecting the chambers (Bi, Bj, and Bk) to the same inverters but at different node locations. When i=3, j=1, k=2, this results in a phase offset of 120° between the leg rotations, and when i=2, j=3, k=1, this results in a phase offset of 240°. The table in FIG. 3A illustrates the different activation combinations for 0°, 120° and 240° offsets.

While the additional capacitance of the chambers from the second pair of legs increased the delay time of each inverter, the elimination of four valves (and their corresponding resistances and capacitances) has the benefit of reducing the overall period of oscillation, simplifying the control circuit and reducing the robot's mass.

The velocity of the robot was measured by tracking the movement of the body of the robot and leg of the robot as visual markers to measure the displacement of the robot for each cycle. We recorded videos for each gait and tracked the position of the body using an open-source video analysis software (Tracker, from Open Source Physics). Measurement of the walking speed for all three phase offsets achievable with this control circuit, i.e., 0°, 120°, 240°, found average robot velocities of −0.005 (s=0.001), 0.024 (s=0.007), and 0.014 (s=0.001) body lengths per second (BL/s), respectively where s is the sample standard deviation. Note that with all the legs rotating in unison, no feet stayed in contact with the ground throughout the gait with a little backward motion due to minor variations in the friction at the feet.

Figure 3C:
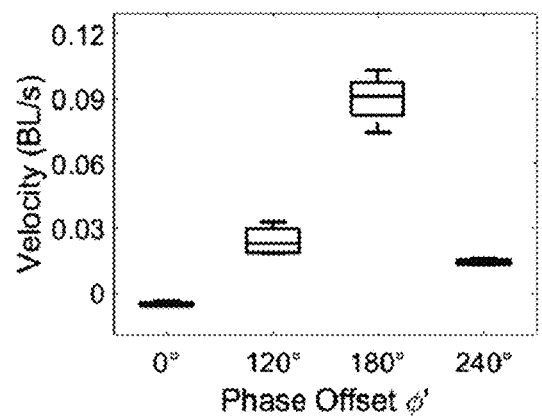

FIG. 3C is a box plot depicting the velocity of the robot for four different phase offsets. The 0°, 120° and 240° phase offsets were controlled with Circuit 1 while the 180° phase offset was controlled by Circuit 2.

Circuit 2: Parallel Oscillator Circuit:

Tortoises with a diagonal couplet gait pattern have approximately a 180° phase offset between the periodic forces exerted by the diagonal pairs of feet (see FIG. 1A). In tests with diagonal couplet gaits having 120° or 240° phase offsets, we observed interference of one couplet with the other that reduced the overall speed of locomotion. The possibility of improved locomotion performance with a 180° phase offset between the diagonal couplets led to testing of a second gait control circuit.

Figure 3D:
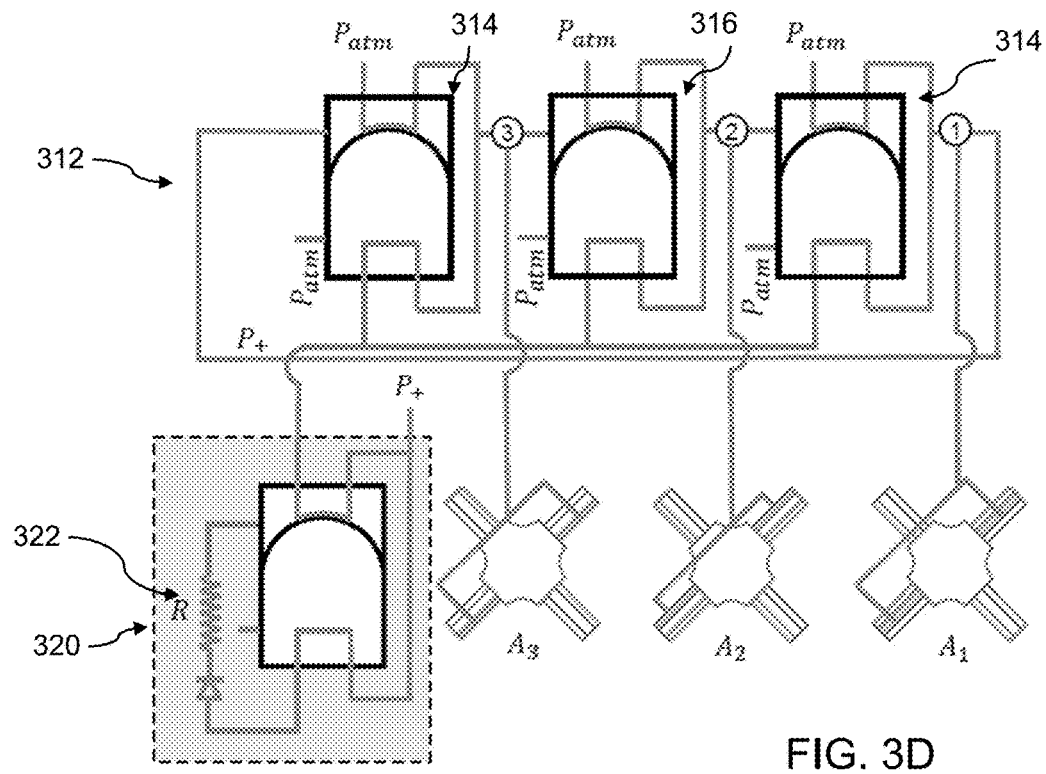

FIG. 3D is a schematic for the "parallel oscillator circuit" (Circuit 2) with ring oscillator 312 controlling the two leg pairs in parallel (one couplet). In the illustrated example, the three valves (314, 316, 318) of ring oscillator 312 control diagonal leg pairs $A_1$, $A_2$, and $A_3$. The second ring oscillator (Oscillator B) is not shown. To tune the phase offset between the A and B oscillators, an additional inverter valve was included to introduce a time delay element. This time delay element was designed to delay the second oscillator only once upon initiation of the circuit. One of the oscillators 312, e.g., Oscillator A, was delayed by phase controller 320 (shown in the figure), while the other (Oscillator B, not shown) was not, resulting in a one-time delay of one oscillator with respect to the other upon activation of both circuits.

Figure 3E:
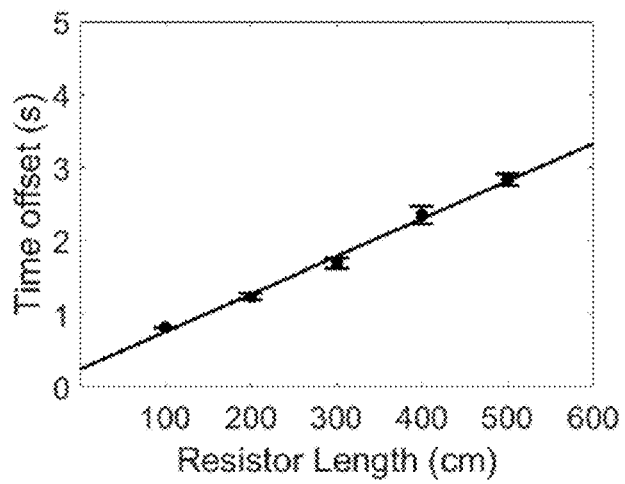

The time offset for the parallel oscillator circuit was controlled by adjusting the length of tubing of the resistor R 322 in phase controller 320. The length of tubing used to form resistor 322 altered the time delay of the second oscillator with respect to the first in the parallel oscillator circuit. The time delay introduced by phase controller 320 was measured for different tube lengths. To determine the time offset, the pressure before and after the phase control elements was measured as a step input pressure was applied. Five experiments were performed for each resistor length and the data points fitted to a linear trendline, shown in FIG. 3E. An increase in the length of the tubing corresponded to a linear increase in phase offset. This is consistent with a model that predicts that the time delay of a valve varies linearly with its resistance R (i.e., the length and inner diameter of a section of tubing). Tubing with a 0.3 mm inner diameter was looped eight times to keep the resistor in a small form factor and to control for the effect of the number of loops of tubing on the fluidic resistance. Each length of tubing was tested three times at a constant applied pressure of 155 kPa. The capacitance of the additional valve and tubing connecting the phase controller to the circuit also contributed to the time offset (using the assumption that this was constant for each trial, i.e., that the capacitance change due to the change in the length of the looped tubing was negligible). A similar approach was used to characterize the pressure in the soft ring oscillator. As shown in FIG. 3E, the delay can be adjusted by changing the resistance of an element R connected to an inverter so that it only delays the circuit once at the initiation of oscillation.

Figure 3F:
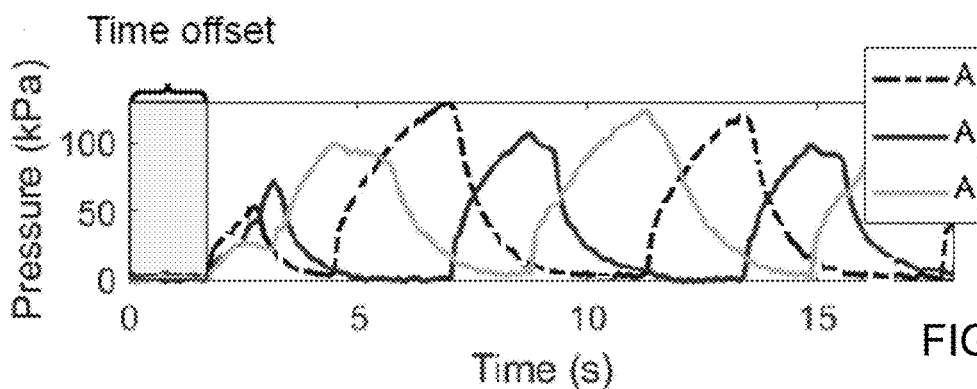

FIG. 3F plots representative measurement of the pressure in the three chambers of the delayed oscillator. The time offset delayed the initiation of the second oscillator (shaded region at the left), effectively controlling the phase between two oscillators. After initially changing state, the soft valve bypassed the resistor, so the resistor would no longer affect the period of oscillation. Thus, after the initial delay, the second oscillator produced the same actuation as its parallel twin, except with a phase offset between the two (plus any variations due to imperfect fabrication). This approach provides finer control of the phase offset between the motions of the diagonal pairs of legs but requires a total of seven valves (six valves for oscillator control plus one valve for phase control).

Comparison of Pneumatic Control Circuits:

To confirm the improved performance of the locomotion gait provided by Circuit 2, we measured the speed of the robot with the phase tuned to approximately 180°. For gait cycles in which the phase offset between the legs was approximately 180°, a walking speed of 0.090 (s=0.012) BL/s was measured (see FIG. 3C). When comparing this value to those for measured for Circuit 1 with fixed phase offsets of 0°, 120°, 240°, there was at least a 270% increase in the speed of the robot with Circuit 2, justifying the additional four valves required. Note that this speed increase was in spite of the increased mass of Circuit 2 (~112 g) with the four extra valves. Based on untethered experiments with varying payload (described below), a 10% decrease in the speed of the robot can be expected as a result of the added mass alone, assuming a linear effect of payload.

While the negative effects of the additional weight of the valves of Circuit 2 were offset by the improved efficiency of the gait, further testing revealed a more practical concern: the larger number of valves introduced more potential points of failure. This consideration was particularly important in the case of laboratory-fabricated, custom components, which tend to have limited lifespans. Thus, to minimize the risk of failure, Circuit 1 was used for most of the remaining testing.

Reversing Leg Rotation with a 4/2 Bistable Control Valve for Omnidirectional Locomotion:

The soft ring oscillator circuits described above actuate the pneumatic chambers of the legs in continuous, cyclical patterns (with various phase offsets between the diagonal couplets). In order to change the walking direction, a more complex circuit is required to reverse the sequence of actuation of the chambers. To achieve this direction reversal with a reduced number of additional components, a component was designed to selectively switch the connections between two of the mirrored pairs of chambers and two of the ring oscillator valves, resulting in a reversed sequence. In the assembly used for testing, the reversal was simplified by the fact that the robot had only three pneumatic chambers per leg. As will be readily apparent to those of skill in the art, if a larger number of pneumatic chambers are to be used, a more complex circuit configuration is required.

Figure 4A:
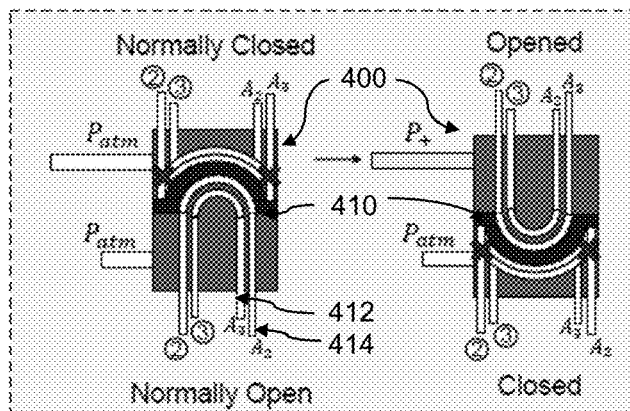
FIG. 4A diagrammatically shows operation of a soft bistable 4/2 valve acting as a latching double pole, double throw (DPDT) switch.
Figure 4A:
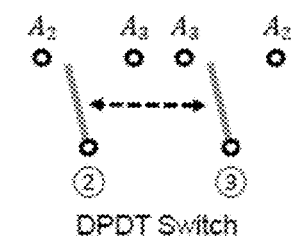
Figure 4B:
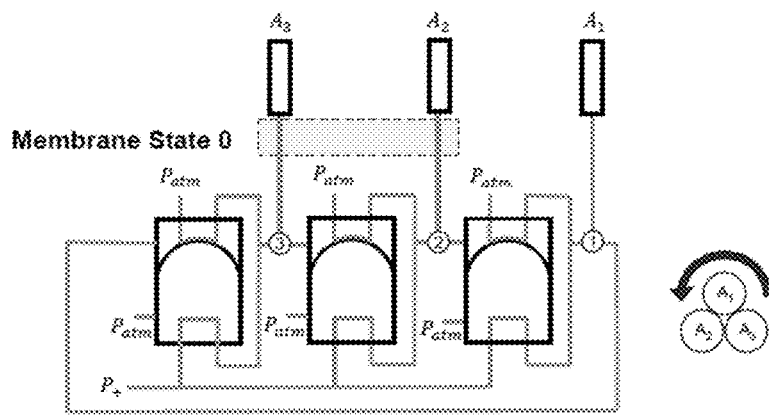
FIGS. 4B and 4C shows switching the direction of rotation of the limbs between counterclockwise and clockwise, respectively.
Figure 4C:
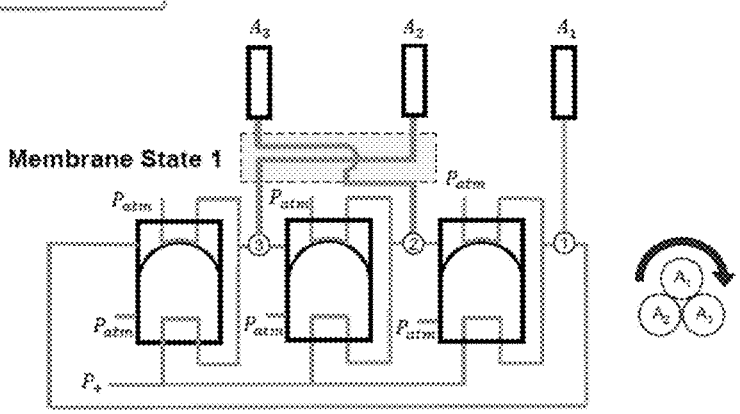
Figure 4D:
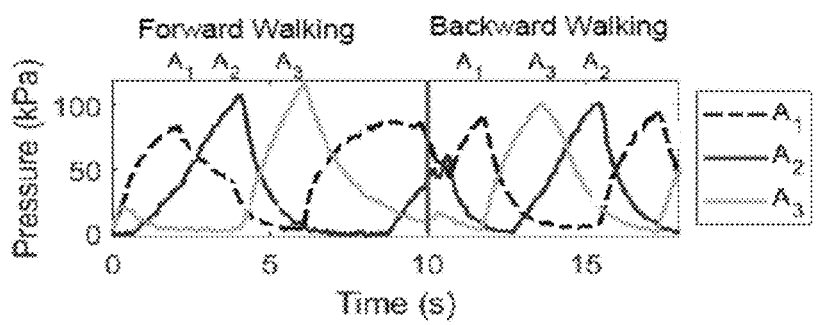
FIG. 4D is a representative plot of the pressure in the three chambers A1, A2, and A3 before and after the controlling 4/2 valve is switched.

Referring to FIG. 4A, the connections between the oscillator and the pneumatic chambers can be switched using a soft 4/2 bistable control valve 400, which is analogous to a latching double pole, double throw (DPDT) switch (pictured at the right side of the figure). Valve 400 controls the flow between four ports by switching between two different membrane states (corresponding to counterclockwise or clockwise rotation of the limbs, shown in FIGS. 4B and 4C, respectively). The inventive approach switches the state of an elastomeric membrane 410 in a manner similar to that used for the 3/2 soft valves of the ring oscillator shown in FIG. 2A, except using two (rather than one) fluid lines 412, 414 connected to either side of the membrane 410. The result of this modification is that the sequence of chamber pressurization reverses when pressure is applied to switch the state of the 4/2 valve (either manually or using a fluid) (see FIG. 4D). Because the membrane is bistable, the valve does not require continuous pressure to remain in a state.

The inventive 4/2 bistable valve utilizes a key modification to previously described soft valves for actuating soft robots. Specifically, by adhering the tubes directly to the membrane, they can be kinked (closed) in one membrane state and opened in the other. This approach allows both tubes to be simply adhered next to one another to create the 4/2 valve.

Figure 5A:
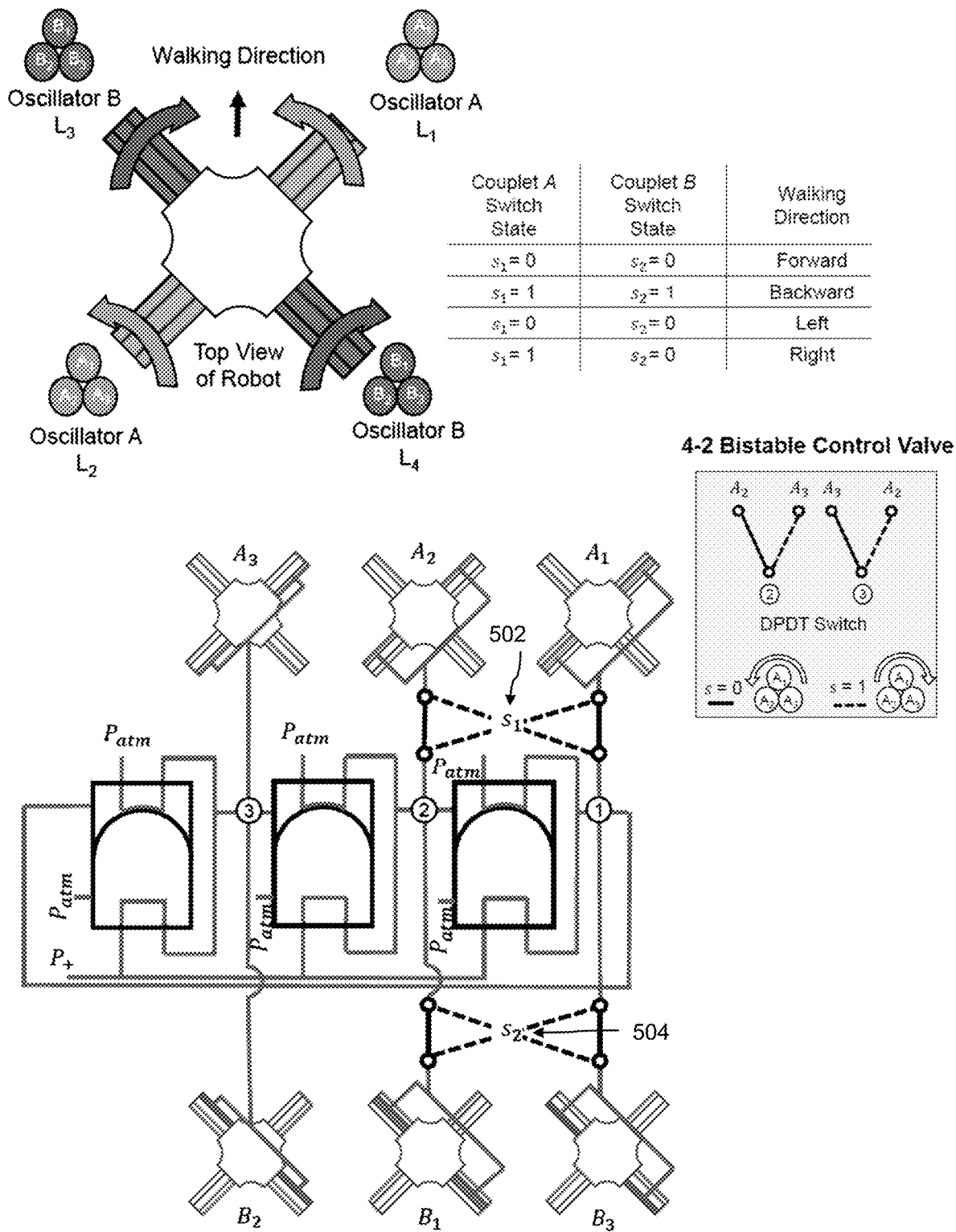
FIGS. 5A-5B illustrate omnidirectional control of the walking direction of the robot with different 4/2 valve combinations, where
Figure 5B:
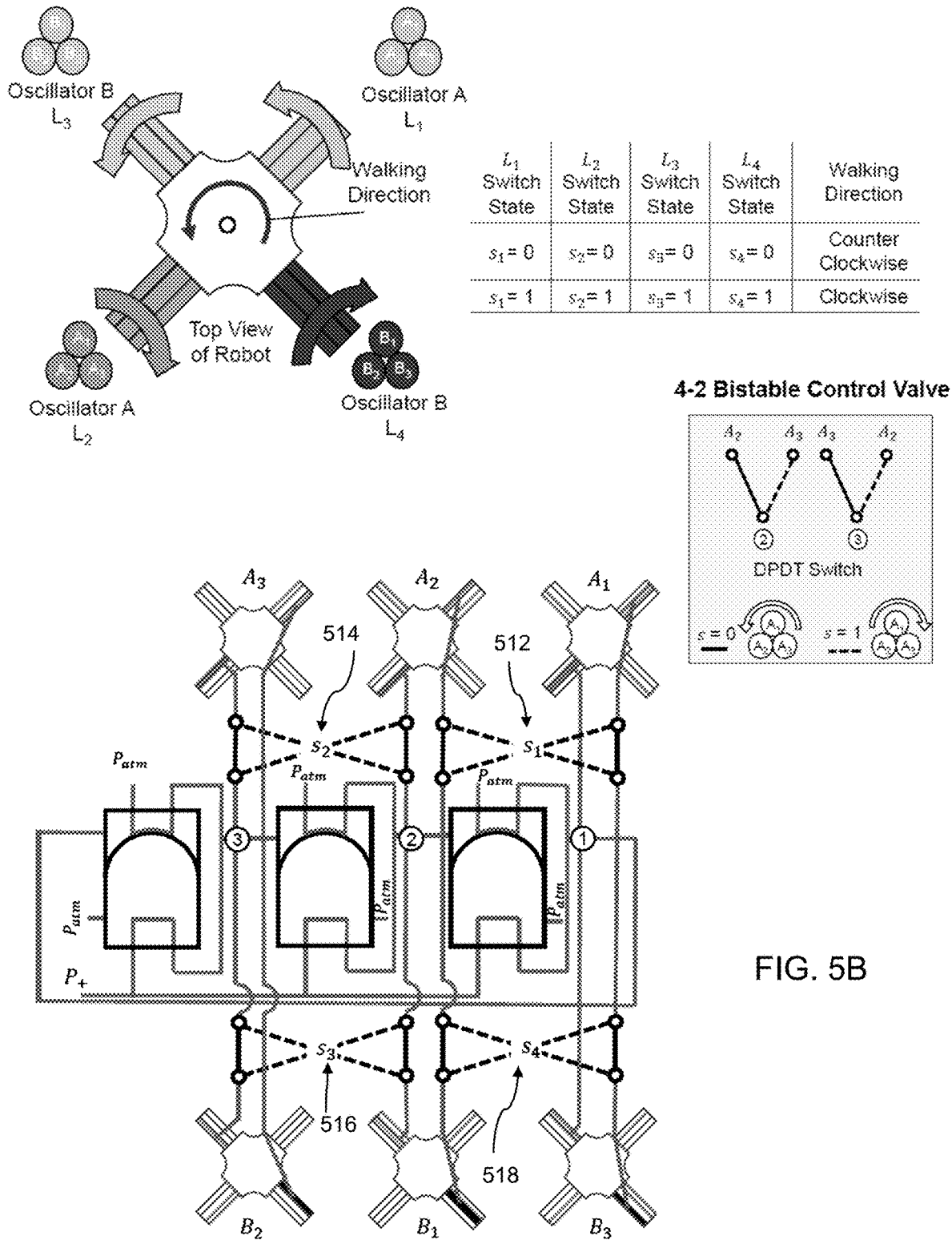

These bistable valves allow selection of the direction of rotation of each pair of legs. Two 4/2 bistable control valves 502, 504 may be used—one for each leg pair—to control the translational walking directions of the robot, as shown in FIG. 5A. The diagram in the upper left panel labels the oscillators A and B and their corresponding leg pairs $L_1/L_2$ and $L_3/L_4$, respectively. The table in the upper right panel maps the switch state of each 4/2 bistable control valve for controlling Oscillator (Couplet) A/Leg pair $L_1/L_2$ and Oscillator (Couplet) B/Leg pair $L_3/L_4$ for different walking directions. Four 4/2 valves 512, 514, 516, 518, i.e., one per leg $L_1$, $L_2$ $L_3$, and $L_4$, provides individual control of the direction of rotation of each leg to enable the four walking directions of FIG. 5A in addition to clockwise or counterclockwise rotation, as shown in FIG. 5B. The table in the upper right panel of the figure maps the four switch states for each leg for rotational walking.

Figure 6A:
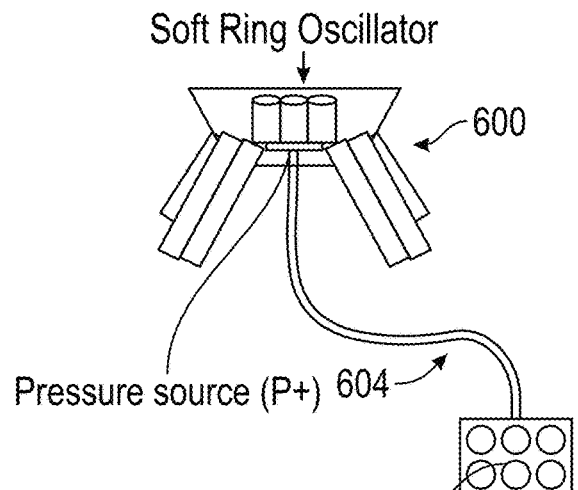
FIGS. 6A-6F show tethered control of the quadruped robot, where
Figure 6B:
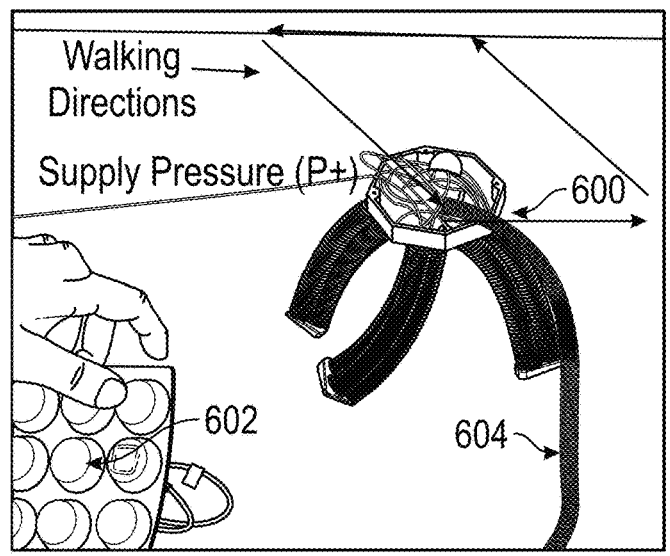
Figure 6C:
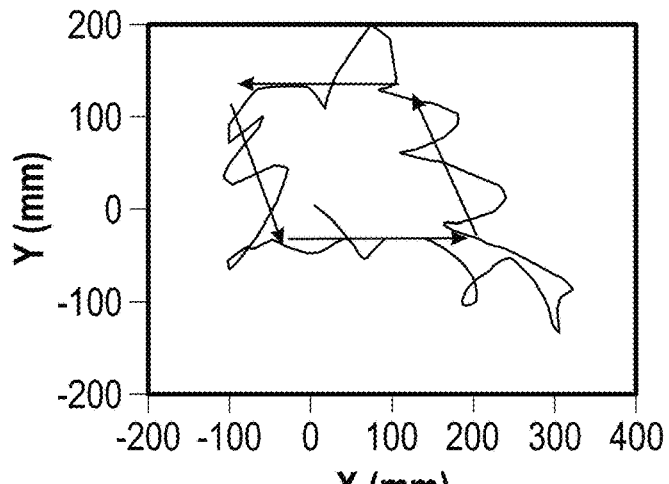

Tethered Control of Omnidirectional Locomotion:

To test control of omnidirectional locomotion, a manual controller was developed to control two 4/2 valves (FIGS. 6A-6C). FIG. 6A provides a simple schematic of a robot 600 with a single pressure supply line 604 tethered to manual controller 602. FIG. 6B is a photographic image of the robot as constructed. The arrows in this figure represent the walking directions: forward, left, backward, then right in sequence, with commanded directions indicated. The controller 602 was an array of bistable elastomeric hemispheres constructed from an ice tray (Zing Pop-Out Ice Cube Tray, Robinson Home Products, Inc.). A "bubble" on the controller 602 was designed to function as half of a 4/2 control valve. Two tubes were located beneath the bubbles of the controller 602, which kinked when the corresponding bubble membranes on the controller were pressed. The tubes from the membranes were connected via tether 604 to the valves of soft ring oscillators of robot 600, serving as switches 502 ($S_1$), 504 ($S_2$) within the circuit shown in FIG. 5A.

To activate switch $S_1$ or $S_2$ of this circuit, one of two bubbles on the controller 602 was pressed to control the walking direction of the robot (pressing both simultaneously would result in an undefined gait). We sequentially commanded the robot to walk forward, left, backward, then right by changing the corresponding valve states using the manual controller. Aside from this input, the robot required only a constant source of pressure (P+) to generate the appropriate gaits. Omnidirectional control was demonstrated using the dual-purpose three-valve ring oscillator circuit (Circuit 1). Although this circuit resulted in slower gaits, it was simpler and lighter than the alternative, i.e., Circuit 2, which required seven valves.

Figure 6D:
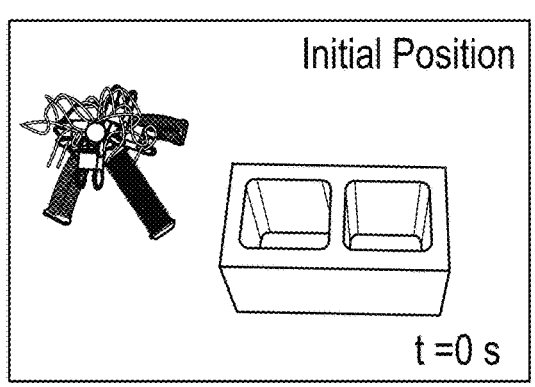
Figure 6D:
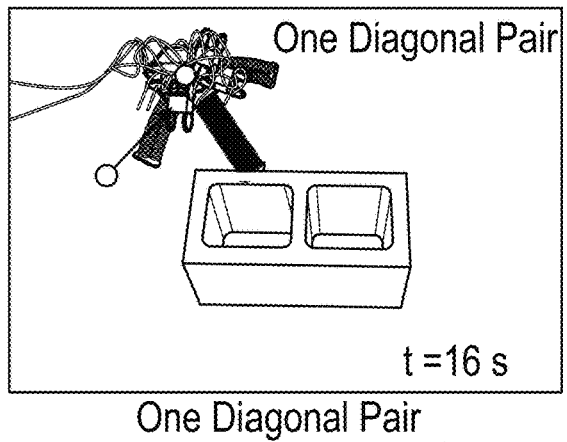
Figure 6D:
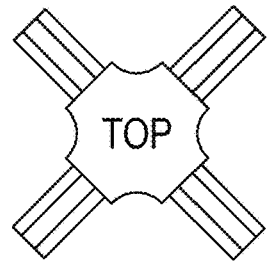
Figure 6E:
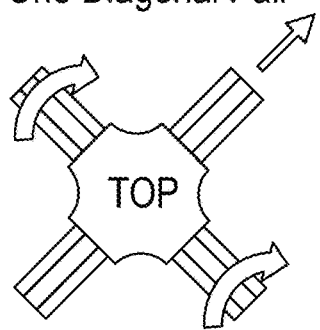
Figure 6F:
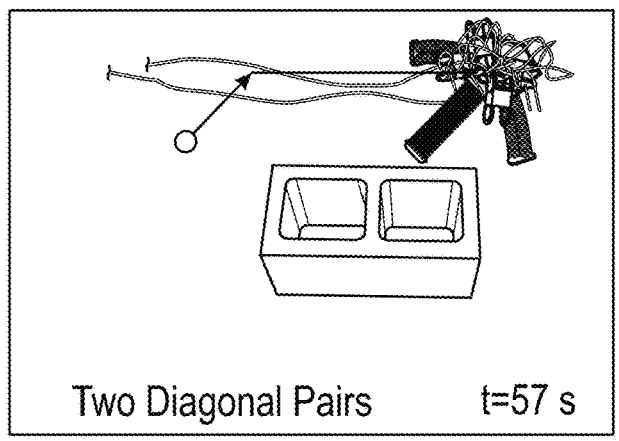
Figure 6F:
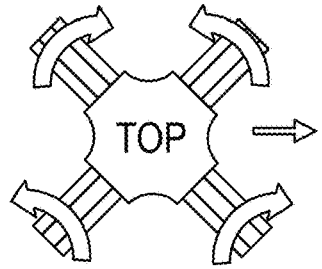

FIG. 6C illustrates the X-Y position of a single point on the robot body during operation taken from a video using motion tracking software. To demonstrate use of omnidirectional locomotion for obstacle avoidance, the diagonal motion generated by one oscillator was controlled with forward movement generated by both oscillators to navigate around an obstacle. FIGS. 6D-6F are images (photographic and schematic) demonstrating manually controlled obstacle avoidance. FIG. 6D shows the robot in its initial position. In FIG. 6E, the robot first walks diagonally (back-left) using one diagonal pair of legs and then walks forward (moving right) with both diagonal pairs. The associated schematics indicate actuation of the legs.

The motion of the robot was quasi-static (no ballistic phase). Thus, when one pair of legs rotated, the robot leaned on one of the limbs of the opposite diagonal pair to remain stable. As a result, based on tracked data of six steps, the top of the feet lifted an average of 150.93 mm (s=27.44 mm) which is 72% of the robot height. The ability of the robot to lift its feet this high off the ground indicates that the robot should be able to navigate over obstacles and uneven terrains.

In some embodiments, the addition of a soft sensor provides the ability to semi-autonomously trigger a reversal of the walking gait upon the robot's contact with an obstacle while still employing a soft-robot construction. The sensor is fabricated using materials and methods similar to that used for the valves except that there is only one cap.

Figures 7A, 7B, 7C:
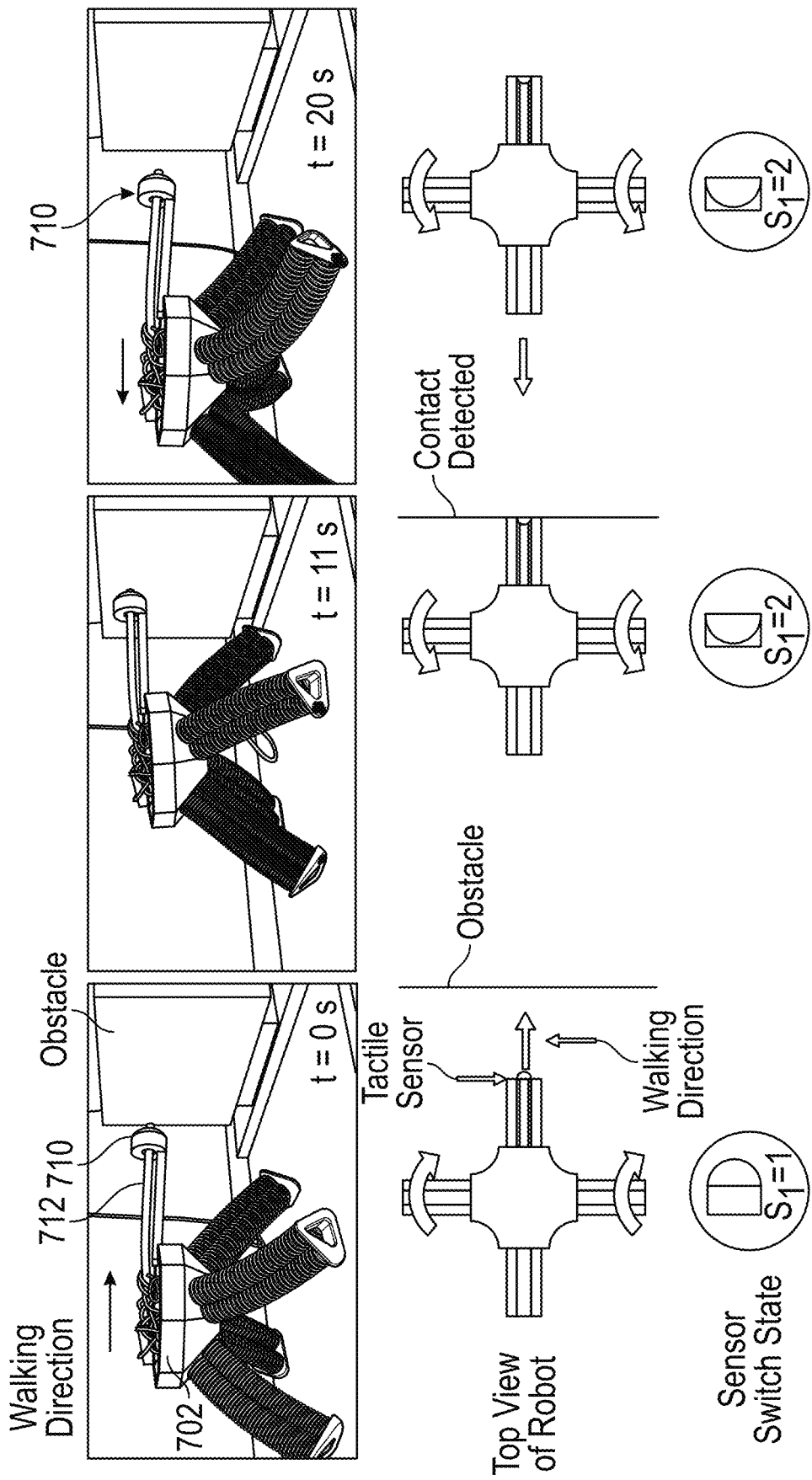
FIGS. 7A-7C illustrate an embodiment with sensor input for autonomous gait reversal, where

Referring to FIGS. 7A-7C, a sensor 710 is formed from an elastomeric membrane (cap) disposed at the end of a fluidic transmission channel, e.g., a tubular arm 712, to a 4/2 bistable control valve located on the body. The fluidic sensor channel is adhered to the sensor cap using a silicone adhesive (SilPoxy). For optimal sensor sensitivity, any air within the channel should be evacuated. One approach involved affixing bleed tubes to the side of the sensor. A 3D printed sensor mount was press-fitted onto the wall of the robot body and glued in place.

When an object (obstacle) is contacted, the sensor membrane 710 applies pressure to the enclosed transmission fluid (e.g., water) within arm 712 to immediately switch the state of the connected 4/2 bistable control valve, resulting in reversal of the direction of motion of the robot. This operation is performed onboard the robot without the need for any electrical components. To increase the sensitivity of the sensor to external contact, the transmission fluid within arm 712 (or other transmission channel) may be pre-pressurized until the connected 4/2 valve is close to the point of instability but still stable. For example, the fluid can be initially pressurized to just under $P_{st}$ for the bistable valve to remain in the initial state.

As shown in FIG. 7A, the pneumatic control circuit, powered by a constant pressure source (not shown), actuates one diagonal pair of legs, causing the robot to initially walk toward an obstacle. The state of the sensor switch $S_1$ is shown as "1". FIG. 7B depicts the moment at which the soft sensor 710 contacts the wall, causing the sensor switch to change states to "2" as the transmission fluid pressure on the bistable valve exceeds $P_{st}$. In FIG. 7C, with sensor switch $S_1$ in state "2", the robot reverses, walking away from the obstacle in the opposite direction.

Untethered walking of the robot can be achieved by powering it with a disposable $CO_2$ canister and a pressure regulator, as shown in FIGS. 1B-1C. The robot walking was tested with the $CO_2$ regulated to 140 kPa. Smaller, commercially-available 57 g $CO_2$ canisters provided about 45 seconds of operation. Larger 306 g cartridges provided about 4 minutes at the same operating pressure. Circuit 1 was used for testing of the untethered robot.

Although the larger canister provided increased operating time, the added weight of the larger canister and regulator (666 g, or 170% of the weight of the robot) negatively impacted the speed of the robot, causing it to walk 42% slower than when carrying the smaller canister and regulator (194 g). The mass of compressed gas used per unit distance traversed by the robot when walking was measured over a 30 second interval of the gait by weighing the canisters before and after walking. With the larger canister, the robot used 1.7× the mass of compressed gas per unit distance compared to the small canister. Thus, the smaller $CO_2$ canister and regulator combination represents a more efficient power source for the robot during untethered operation but provides reduced operation time (45 seconds vs. 4 minutes).

Even when controlled with a completely pneumatic circuit, and carrying its own power source, the robot described herein exhibited considerable improvement in top speed (0.09 BL/s) compared to the tethered, soft legged robot controlled by electromechanical components (0.13 BL/s) described by Drotman, et al. (2017).

Soft, pneumatically actuated valves such as those described herein are inexpensive, lightweight, and easy to manufacture compared to the electromechanical valves commonly used to control soft robots. With appropriate design, these components can be combined to create sophisticated fluidic circuits that can control the gait of legged robots without any electronics. Such fluidic circuits employing a soft ring oscillator can generate rhythmic motions and control omnidirectional locomotion of a soft legged robot to navigate around obstacles.

The properties of biological CPGs (central pattern generators) provide benefits for walking gaits as they enable animals to generate stable rhythmic movements using minimal control inputs (i.e., minimal descending locomotor commands). In particular, the neurons in CPG networks produce signals that generate oscillatory motions (gaits) that are robust to disturbances, and sensor inputs act on these signals to adjust the gaits in response to interactions with the environment. Inspired by CPGs, the inventive pneumatic circuits use a single pneumatic source to generate oscillatory motion, thus reducing the number of components—and hence the weight—of the robotic system. When perturbed by temporarily changing the pressure in the pneumatic circuit, the circuits tend to return to their rhythmic oscillation within a single cycle. The pneumatic logic components and sensors allow the robot to adjust its stable rhythmic pattern based on information from the external world.

Using the approach described herein, the frequency and amplitude of the walking gaits (and hence the speed and foot clearance of the walking robot) can be modulated based on the design of the pneumatic components (e.g., the dimensions of the membranes of the valves). The relationships between the snap-through and snap-back pressures establish the membrane parameters appropriate for implementation of a walking robot. Adjustment of these parameters, e.g., using different membrane dimensions, allows variation of amplitude and frequency of limb oscillation during operation.

The physical size of the elements of a pneumatic circuit depends on the demands placed on the circuit. The pneumatic elements are designed to work within the operating pressures of the soft robot and the pneumatic elements are required to transmit sufficient fluid pressure to actuate the robot. As a result, the elements add considerable mass and volume to the system, both of which potentially limit the performance of an untethered walking robot. These challenges are exacerbated by the increase in complexity of the circuit required to increase the autonomy of the system. Approaches to reduce the mass and volume of the pneumatic circuits may include separating the pneumatic system into "power" and "control" circuits as is typically done with electronics.

As will be apparent to those of skill in the art, the inventive circuits may be extended to implement robots with more/fewer limbs, or limbs with a different number of degrees of freedom (DoF). The number of DoFs for the oscillatory movement scales linearly with the number of valves as long as the number of chambers is odd (e.g., oscillating 3 chambers requires 3 valves, but oscillating 4 chambers requires 5 valves). However, reversing sequences of more than 3 chambers requires more 4-2 bistable valves. By inspection, we find that for n chambers on each leg (when n is greater than 1 and odd), there needs to be bistable valves to change the direction of rotation of the legs.

Overall, the integration of the inventive soft pneumatic control circuits into the body of the robot is a step towards autonomous, electronics-free, mobile soft robotic systems. This approach could lead to robots useful for a variety of applications, including operating in environments sensitive to spark ignition (e.g., in underground mines or in emergencies relating to the release of hazardous or explosive fumes), in environments that do not allow metal (e.g., MRI operation) or hard objects, or for the mass production of simple, inexpensive autonomous systems (e.g., for cleaning robots or for entertainment).

The invention claimed is:

1. A pneumatic circuit for controlling activation of a robot, the circuit comprising:
    inflatable chambers configured for inflation using fluid from a fluid source;
    a plurality of fluid channels, each channel configured to communicate fluid from the fluid source to the inflatable chambers;
    at least one ring oscillator comprising a plurality of valves connected in series, the at least one ring oscillator in fluid communication with the inflatable chambers, each valve configured to control flow of fluid between the fluid source and at least one inflatable chamber to switch a state of the at least one inflatable chamber between inflated and deflated, wherein actuation of the plurality of valves in a first order induces inflation of the inflatable chambers in a first sequence; and
    at least one control valve in fluid communication with the at least one ring oscillator, the at least one control valve configured to modify an order of actuation of the plurality of valves to at least one second sequence different from the first sequence.

2. The circuit of claim 1, wherein the inflatable chambers are arranged in couplets and the at least one ring oscillator comprises a plurality of ring oscillators, wherein a ring oscillator is associated with each couplet.

3. The circuit of claim 2, further comprising a phase controller, wherein one ring oscillator of the plurality is in communication with the phase controller to introduce a one-time offset in initiation of activation of one of the couplets.

4. The circuit of claim 2, wherein the at least one control valve comprises one control valve for each couplet.

5. The circuit of claim 1, wherein the robot is configured for movement, and wherein the first sequence effects motion of the robot in a forward direction and the at least one second sequence effects motion in one or more of a reverse direction, a clockwise direction and a counterclockwise direction.

6. The circuit of claim 1, wherein each valve comprises a three port, two-state valve.

7. The circuit of claim 1, wherein the at least one control valve comprises a four port, bistable valve.

8. The circuit of claim 1, wherein each valve comprises an elastomeric membrane, wherein the valve is configured to regulate flow by closing and opening channels using a snap-through instability in the membrane.

9. The circuit of claim 1, wherein the at least one control valve comprises a fluid-based sensor configured for detecting contact with an object and autonomously changing the order of actuation in response to detected contact.

10. The circuit of claim 9, wherein the fluid-based sensor comprises:
an elongated fluid channel, the fluid channel having a distal end and a proximal end, the proximal end connected to the at least one control valve;
a membrane disposed at the distal end of the fluid channel; and
a fluid retained within the channel, the fluid configured to transmit pressure from the membrane to the at least one control valve when the membrane contacts the object, wherein the transmitted pressure changes a state of the at least one control valve to cause the at least one ring oscillator to reverse a walking direction of the robot.

11. The circuit of claim 10, wherein the fluid is pre-pressurized to a pressure below but close to a point of instability of the at least one control valve.

12. The circuit of claim 1, wherein the at least one control valve comprises a non-electronic manual controller connected to the robot via fluid tubing, the controller comprising an array of bubble membranes, wherein depressing a selected bubble membrane applies switches valve states within the at least one ring oscillator.

13. The circuit of claim 5, wherein the inflatable chambers comprise tubing bundled in parallel to define pairs of limbs extending from a robot body in a diagonal arrangement, wherein actuation of the plurality of valves in the first sequence induces sequential bending and rotation of the limbs to effect walking.

14. The circuit of claim 13, wherein the pairs of limbs are mirrored, and wherein actuation of the plurality of valves in the first order causes a first pair of limbs to rotate in a first direction followed by sequential actuation of the plurality of valves in the second order causes a second pair of limbs to rotate in a second direction different from the first direction.

15. The circuit of claim 13, wherein the at least one ring oscillator comprises at least two ring oscillators, wherein each pair of limbs is controlled by a separate ring oscillator.

16. The circuit of claim 1, wherein the fluid source comprises a pressurized gas canister.

17. The circuit of claim 16, wherein the pressurized gas canister is mounted on a body of the robot.

18. The circuit of claim 1, wherein the fluid is carbon dioxide.

19. The circuit of claim 1, wherein the fluid source comprises an external source comprising an air tank or pump, and further comprising an umbilical tubing connecting the robot and the external source.

20. A pneumatic circuit for controlling activation of a soft-limbed robot comprising a plurality of inflatable chambers, each chamber configured for inflation using an inflation fluid, the circuit comprising:
a fluid source;
a plurality of fluid channels, each channel configured to communicate fluid from the fluid source to the plurality of chambers;
at least one ring oscillator comprising a plurality of valves connected in series, each valve configured to control flow of fluid into at least one inflatable chamber to switch a state of the at least inflatable chamber between inflated and deflated, wherein sequential actuation of the plurality of valves induces sequential inflation or deflation of the plurality of chambers; and
at least one control valve in fluid communication with the at least one ring oscillator, the at least one control valve configured to modify an order of actuation of the plurality of valves to at least one second sequence different from the first sequence.

21. The circuit of claim 20, wherein the plurality of chambers comprise tubing bundled in parallel to define at least two pairs of limbs extending from a robot body in a diagonal arrangement, each limb comprising n chambers having a proximal end and a distal end, wherein the proximal end is connected to the robot body and the distal end has a foot disposed thereon.

22. The circuit of claim 21, wherein the at least two pairs of limbs comprise two mirrored couplets, and wherein sequential actuation of the plurality of valves in a first order causes a first couplet to rotate in a first direction followed by sequential actuation of the plurality of valves in a second order causes a second couplet to rotate in a second direction.

23. The circuit of claim 22, wherein sequential actuation of the plurality of valves in reverse of the first order causes a first couplet to reverse from the first direction followed by sequential actuation of the plurality of valves in a reverse of the second order causes the second couplet to reverse from the second direction.

24. The circuit of claim 20, wherein the plurality of valves are connected to induce a phase offset between the first couplet and the second couplet.

25. The circuit of claim 24, wherein the phase offset is controlled by connecting the chambers of the second couplet to the valves in an order that differs from a connection order of the inflatable chambers of the first couplet.

26. The circuit of claim 20, wherein each valve comprises an elastomeric membrane, wherein the valve is configured to regulate flow by closing and opening channels using a snap-through instability in the membrane.

27. The circuit of claim 20, wherein each valve comprises a three port, two-state valve.

28. The circuit of claim 20, wherein the at least one control valve comprises a four port, bistable valve.

29. The circuit of claim 21, further comprising a bistable control valve connected to each pair of limbs, wherein the bistable control valve is configured to switch a direction of rotation of each limb individually between counterclockwise and clockwise.

30. The circuit of claim 19, wherein the plurality of inflatable chambers comprises n chambers, where n is an odd integer of three or more, and the plurality of valves is n valves.

31. A method for controlling motion of a robot having a plurality of inflatable chambers, each chamber configured for inflation using fluid from a fluid source, the method comprising:
providing at least one ring oscillator comprising a plurality of valves connected in series, each valve configured to control flow of fluid from a fluid source into at least one chamber to switch a state of the at least one chamber between inflated and deflated, wherein sequential actuation of the plurality of valves induces motion in a first direction; and
switching an order of sequential actuation of the plurality of valves to change motion to a second direction.

32. The method of claim 31, wherein switching is initiated autonomously by a bistable control valve in fluid communication with a sensor membrane, wherein the bistable control valve changes the order of sequential actuation when the sensor membrane contacts an object.

33. The method of claim 31, wherein switching is initiated by depressing a membrane on a manual controller.

34. The method of claim 31, wherein the plurality of chambers comprise tubing bundled in parallel to define at least two pairs of limbs extending from a robot body in a diagonal arrangement, each limb comprising n chambers having a proximal end and a distal end, wherein the at least two pairs of limbs comprise two mirrored couplets, and wherein sequential actuation of the plurality of valves in a first order causes a first couplet to rotate in a first direction followed by sequential actuation of the plurality of valves in a second order causes a second couplet to rotate in a second direction.

35. The method of claim 34, wherein sequential actuation of the plurality of valves in reverse of the first order causes a first couplet to reverse from the first direction followed by sequential actuation of the plurality of valves in a reverse of the second order causes the second couplet to reverse from the second direction.

36. The method of claim 34, wherein the plurality of valves are connected to induce a phase offset between the first pair of limbs and the second pair of limbs.

37. The method of claim 36, wherein the phase offset is controlled by connecting the inflatable chambers of the second pair of limbs to the valves in an order that differs from a connection order of the inflatable chambers of the first pair of limbs.

* * * * *